(12) United States Patent
Kasai et al.

(10) Patent No.: US 7,708,933 B2
(45) Date of Patent: May 4, 2010

(54) DRYING METHOD OF CERAMIC MOLDED BODY

(75) Inventors: Kenichiro Kasai, Ibi-gun (JP); Kazuya Naruse, Courtenay (FR)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/928,359

(22) Filed: Oct. 30, 2007

(65) Prior Publication Data

US 2008/0106008 A1 May 8, 2008

Related U.S. Application Data

(63) Continuation of application No. PCT/JP2006/302862, filed on Feb. 17, 2006.

(51) Int. Cl.
*C04B 33/30* (2006.01)
(52) U.S. Cl. .................. 264/605; 264/607; 264/630; 34/442
(58) Field of Classification Search .............. 264/605, 264/607, 630, 631; 34/438, 440, 442
See application file for complete search history.

(56) References Cited

U.S. PATENT DOCUMENTS

| 2,245,181 | A | * | 6/1941 | Brooks ............. 264/605 |
| 5,106,295 | A | | 4/1992 | Misawa |
| 5,914,187 | A | | 6/1999 | Naruse et al. |
| 6,669,751 | B1 | | 12/2003 | Ohno et al. |
| 7,112,233 | B2 | | 9/2006 | Ohno et al. |
| 7,284,980 | B2 | | 10/2007 | Saijo et al. |
| 7,309,370 | B2 | | 12/2007 | Kudo et al. |
| 7,332,014 | B2 | | 2/2008 | Ono et al. |

(Continued)

FOREIGN PATENT DOCUMENTS

EP 0732558 9/1996

(Continued)

OTHER PUBLICATIONS

EP 0732558 (Hatton, Philippe) Sep. 18, 1996 (English machine translation of foreign patent already of record on applicant's IDS of Jan. 30, 2008). [online] [retrieved Feb. 23, 2009]. Retrieved from: esp@cenet and Google Translate.*

*Primary Examiner*—Steven P Griffin
*Assistant Examiner*—Erin Snelting
(74) *Attorney, Agent, or Firm*—Ditthavong Mori & Steiner, P.C.

(57) ABSTRACT

A drying jig circulating apparatus includes a drying jig assembling apparatus for assembling a drying jig on a movable table, a drying apparatus for drying a ceramic molded body held by the drying jig, and a drying jig disassembling apparatus for disassembling the drying jig on a movable table, and a drying jig circulating conveyor for transporting the drying jig from the disassembling apparatus to the assembling apparatus. The drying jig is configured by two or more separate jigs with a fixing member that integrates the separate jigs, or formed by one openable jig with a fixing member for maintaining a closed state. The drying jig assembling apparatus further includes a molded body mounting mechanism, a ceramic molded body holding mechanism, and a jig delivering mechanism. The drying jig disassembling apparatus further includes a jig receiving mechanism, a jig releasing mechanism, and a molded body taking-out mechanism.

6 Claims, 9 Drawing Sheets

U.S. PATENT DOCUMENTS

| | | |
|---|---|---|
| 7,341,614 B2 | 3/2008 | Hayashi et al. |
| 7,348,049 B2 | 3/2008 | Yoshida |
| 7,387,829 B2 | 6/2008 | Ohno et al. |
| 7,393,376 B2 | 7/2008 | Taoka et al. |
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 2003/0014856 A1* | 1/2003 | Yamaguchi et al. ............ 29/559 |
| 2003/0090038 A1* | 5/2003 | Ishikawa et al. ............ 264/432 |
| 2003/0102602 A1* | 6/2003 | Miura ........................ 264/489 |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2006/0283039 A1* | 12/2006 | Ishii et al. ..................... 34/282 |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| FR | 1447681 | 7/1966 |
| FR | 2441142 | 6/1980 |
| GB | 1109661 | 4/1968 |
| JP | 63-162203 | 7/1988 |
| JP | 2001-130973 | 5/2001 |
| JP | 2002-255654 | 9/2002 |
| WO | WO 2005/024326 | 3/2005 |

* cited by examiner

A-A line cross-sectional view

DRYING METHOD OF CERAMIC MOLDED BODY

CROSS-REFERENCE TO RELATED APPLICATIONS

This application claims priority under 35 U.S.C. §120 as a continuation application of PCT/JP2006/302862 filed on Feb. 17, 2006. The contents of this application are incorporated herein by reference in their entirety.

BACKGROUND OF THE INVENTION

1. Field of the Invention

The present invention relates to a drying jig assembling apparatus, a drying jig disassembling apparatus, a drying jig circulating apparatus, a drying method of a ceramic molded body, and a method for manufacturing a honeycomb structure.

2. Discussion of the Background

In recent years, particulates such as soot contained in exhaust gases that are discharged from internal combustion engines of vehicles such as buses and trucks, and construction machines and the like, have raised serious problems as contaminants harmful to the environment and the human body.

Various honeycomb filters using honeycomb structures made from porous ceramic materials, which serve as filters that capture particulates in exhaust gases to purify the exhaust gases, have been proposed.

Conventionally, upon manufacturing such a honeycomb structure, first, a wet mixture is prepared by mixing ceramic powder, a binder and a dispersant solution or the like with one another. Moreover, the wet mixture is continuously extrusion-molded through a die, and the extruded molded body is cut into a predetermined length so that a pillar-shaped honeycomb molded body is manufactured.

Next, the resulting honeycomb molded body is dried by using a microwave drying method or a hot-air drying method.

Thereafter, the end portions of this honeycomb molded body are plugged by a plug material paste mainly composed of the ceramic powder into a diced pattern, and then respective degreasing and firing processes are carried out on the resulting honeycomb molded body so that a honeycomb fired body is manufactured.

Thereafter, a sealing material paste is applied to the side faces of the honeycomb fired body, and the honeycomb fired bodies are mutually bonded by using a adhesive so that an aggregate of the honeycomb fired bodies in which a number of the honeycomb fired bodies are combined with one another by interposing the sealing material layer (adhesive layer) is manufactured. Next, cutting is carried out on the resulting aggregate of the honeycomb fired bodies so that it is formed into a predetermined shape, such as a cylindrical shape and a cylindroid shape, by using a cutting machine or the like so that a honeycomb block is formed, and lastly, a sealing material paste is applied onto the periphery of the honeycomb block to form a sealing material layer (coat layer); thus, the manufacturing processes for the honeycomb structure are completed.

In such a manufacturing method of a honeycomb structure, JP-A 2001-130973 has disclosed a drying method in which: in order to prevent warping in the honeycomb molded body and cracks and the like in the cell walls from occurring upon drying a honeycomb molded body, a drying jig configured by an upper jig and a lower jig is used and the drying process is carried out with the honeycomb molded body being enclosed into a tightly contact state from above as well as from below with these upper and lower jigs.

Moreover, with respect to the drying method of a honeycomb molded body, WO 2005/024326 A1 has disclosed a method in which, in order to repeatedly use a tray on which the honeycomb molded body is mounted, the tray is circulated.

The contents of JP-A 2001-130973 and WO 2005/024326 A1 are incorporated herein by reference in their entirety.

SUMMARY OF THE INVENTION

A drying jig assembling apparatus in accordance with the present invention includes a robot arm; and a movable table for placing a drying jig that holds a ceramic molded body upon drying the ceramic molded body thereon. The drying jig assembling apparatus is configured to make the drying jig hold the ceramic molded body upon the movable table.

The drying jig is either of a drying jig configured by two or more separate jigs, any of the separate jigs including a fixing member that integrates the separate jigs, or a drying jig formed by one openable jig, including a fixing member for maintaining a closed state.

The drying jig assembling apparatus further includes a molded body mounting mechanism that mounts the ceramic molded body at a predetermined position of the drying jig placed on the movable table by using the robot arm; and a ceramic molded body holding mechanism capable of moving the fixing member after the drying jig is integrated or put in the closed state so that the drying jig is maintained in a state holding the ceramic molded body.

In the drying jig assembling apparatus in accordance with the present invention, the robot arm desirably includes a suction mechanism that suction-holds the ceramic molded body.

In addition, in the drying jig assembling apparatus in accordance with the present invention, the robot arm desirably includes a grabbing mechanism that transports, assembles (fixes) or disassembles the drying jig.

Moreover, the drying jig assembling apparatus in accordance with the present invention desirably uses as the drying jig, a drying jig that is configured to hold a square pillar shaped ceramic molded body such that a longitudinal direction of the ceramic molded body is horizontally maintained and diagonal apexes of a square shape on a cross-section perpendicular to the longitudinal direction of the ceramic molded body are aligned on same vertical line.

In the drying jig assembling apparatus in accordance with the present invention, the drying jig is desirably configured by an upper jig and a lower jig, and the fixing member is desirably attached to the upper jig.

A drying jig disassembling apparatus in accordance with the present invention includes a robot arm; and a movable table for placing a drying jig that holds a ceramic molded body upon drying the ceramic molded body thereon. The drying jig disassembling apparatus is configured to take out the ceramic molded body held by the drying jig upon the movable table. The drying jig is either of a drying jig configured by two or more separate jigs, any of the separate jigs including a fixing member that integrates the separate jigs, or a drying jig formed by one openable jig, including a fixing member for maintaining a closed state.

The disassembling apparatus further includes a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

In the drying jig disassembling apparatus in accordance with the present invention, the robot arm desirably includes a suction mechanism that suction-holds the ceramic molded body.

Moreover, the drying jig disassembling apparatus in accordance with the present invention desirably uses as the drying jig, a drying jig that is configured to hold a square pillar-shaped ceramic molded body such that the longitudinal direction of the ceramic molded body is horizontally maintained and diagonal apexes of a square shape on a cross-section perpendicular to the longitudinal direction of the ceramic molded body are aligned on same vertical line.

In the drying jig disassembling apparatus in accordance with the present invention, the drying jig is desirably configured by an upper jig and a lower jig, and the fixing member is attached to the upper jig.

A drying jig circulating apparatus in accordance with the present invention includes a drying jig assembling apparatus including a robot arm and a movable table for placing a drying jig that holds a ceramic molded body upon drying the ceramic molded body thereon. The drying jig assembling apparatus is configured to make the drying jig hold the ceramic molded body upon the movable table.

The drying jig circulating apparatus further includes a drying apparatus for drying the ceramic molded body held by the drying jig; a drying jig disassembling apparatus including a robot arm and a movable table for placing a drying jig that holds a ceramic molded body upon drying the ceramic molded body thereon, the drying jig disassembling apparatus configured to take out the ceramic molded body held by the drying jig upon the movable table; and a drying jig circulating conveyor for transporting the drying jig from which the ceramic molded body has been taken out by the drying jig disassembling apparatus to the drying jig assembling apparatus.

The drying jig is either of a drying jig configured by two or more separate jigs, any one of the separate jigs including a fixing member that integrates the separate jigs, or a drying jig formed by one openable jig, including a fixing member for maintaining a closed state.

The drying jig assembling apparatus further includes a molded body mounting mechanism that mounts the ceramic molded body at a predetermined position of the drying jig placed on the movable table by using the robot arm; a ceramic molded body holding mechanism capable of moving the fixing member after the drying jig is integrated or put in the closed state so that the drying jig is maintained in a state holding the ceramic molded body; and a jig delivering mechanism that delivers and receives the drying jig holding the ceramic molded body to and from the drying apparatus.

The drying jig disassembling apparatus further includes a jig receiving mechanism that receives the drying jig holding the ceramic molded body from the drying apparatus; a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

In the drying jig circulating apparatus in accordance with the present invention, the drying apparatus desirably includes a drying furnace with an inter-furnace transporting conveyor used for transporting the drying jig.

In addition, in the drying jig circulating apparatus in accordance with the present invention, the drying apparatus desirably includes a drying jig stacking device for stacking the drying jigs into multiple stages; and a drying jig stage-disassembling device for disassembling stacked drying jigs with multiple stages into each stage.

In addition, in the drying jig circulating apparatus in accordance with the present invention, the drying apparatus is desirably provided with a plurality of hot-air blowing openings and/or a plurality of cold-air blowing openings on both of sides of the inter-furnace transporting conveyor.

A drying method of a ceramic molded body in accordance with the present invention includes drying the ceramic molded body with the ceramic molded body being held on the drying jig by using a drying jig assembling apparatus including a robot arm and a movable table for placing a drying jig that holds a ceramic molded body upon drying the ceramic molded body thereon. The drying jig assembling apparatus used in the method is configured to make the drying jig hold the ceramic molded body upon the movable table.

The drying step is conducted by further using a drying apparatus for drying the ceramic molded body held by the drying jig, and a drying jig disassembling apparatus including a robot arm and a movable table for placing a drying jig that holds a ceramic molded body upon drying the ceramic molded body thereon, the drying jig disassembling apparatus configured to take out the ceramic molded body held by the drying jig upon the movable table.

The drying jig used in the method is either of a drying jig configured by two or more separate jigs, any of the separate jigs including a fixing member that integrates the separate jigs, or a drying jig formed by one openable jig, including a fixing member for maintaining a closed state.

The drying jig assembling apparatus used in the method further includes a molded body mounting mechanism that mounts the ceramic molded body at a predetermined position of the drying jig placed on the movable table by using the robot arm; a ceramic molded body holding mechanism capable of moving the fixing member after the drying jig is integrated or put in the closed state so that the drying jig is maintained in a state holding the ceramic molded body; and a jig delivering mechanism that delivers and receives the drying jig holding the ceramic molded body to and from the drying apparatus.

The drying jig disassembling apparatus used in the method further includes a jig receiving mechanism that receives the drying jig holding the ceramic molded body from the drying apparatus; a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

Desirably, the drying method of a ceramic molded body in accordance with the present invention further uses a drying jig circulating conveyor for transporting the drying jig from which the ceramic molded body has been taken out by the drying jig disassembling apparatus to the drying jig assembling apparatus.

In addition, in the drying method of a ceramic molded body in accordance with the present invention, the ceramic molded body held by the drying jig is desirably dried while the drying jig is transported one stage by one stage or transported on the drying jigs stacked in multiple stages.

In addition, the drying apparatus desirably includes a drying furnace with an inter-furnace transporting conveyor used for transporting the drying jig.

In addition, the drying apparatus is desirably provided with a plurality of hot-air blowing openings and/or a plurality of cold-air blowing openings on both of sides of the inter-furnace transporting conveyor.

In the drying method of a ceramic molded body in accordance with the present invention, the ceramic molded body is desirably a pillar-shaped honeycomb molded body.

A method for manufacturing a honeycomb structure in accordance with the present invention includes producing a pillar-shaped honeycomb molded body having a large number of cells longitudinally placed in parallel with one another with a cell wall therebetween by molding a ceramic raw material; drying the honeycomb molded body in a state held by a drying jig; and firing the dried honeycomb molded body so that a honeycomb structure including a honeycomb fired body is manufactured.

The drying jig used in the method is either of a drying jig configured by two or more separate jigs, any of the separate jigs including a fixing member that integrates the separate jigs, or a drying jig formed by one openable jig, including a fixing member for maintaining a closed state.

The drying of the honeycomb molded body is carried out by using a drying jig assembling apparatus including a robot arm and a movable table for placing a drying jig that holds a honeycomb molded body upon drying the honeycomb molded body thereon, the drying jig assembling apparatus configured to make the drying jig hold the honeycomb molded body upon the movable table; a drying apparatus for drying the honeycomb molded body held by the drying jig; and a drying jig disassembling apparatus including a robot arm and a movable table for placing a drying jig that holds a honeycomb molded body upon drying the honeycomb molded body thereon, the drying jig disassembling apparatus configured to take out the honeycomb molded body held by the drying jig upon the movable table.

The drying jig assembling apparatus used in the method further includes a molded body mounting mechanism that mounts the honeycomb molded body at a predetermined position of the drying jig placed on the movable table by using the robot arm; a honeycomb molded body holding mechanism capable of moving the fixing member after the drying jig is integrated or put in the closed state so that the drying jig is maintained in a state holding the honeycomb molded body; and a jig delivering mechanism that delivers and receives the drying jig holding the honeycomb molded body to and from the drying apparatus.

The drying jig disassembling apparatus used in the method further includes a jig receiving mechanism that receives the drying jig holding the honeycomb molded body from the drying apparatus; a jig releasing mechanism capable of moving the fixing member in such a manner that the held state of the ceramic molded body maintained by the honeycomb molded body placed on the movable table is released; and a molded body taking-out mechanism that takes out the honeycomb molded body held by the drying jig by using the robot arm.

Desirably, the above-mentioned method for manufacturing a honeycomb structure in accordance with the present invention further includes using a drying jig circulating conveyor for transporting the drying jig from which the honeycomb molded body has been taken out by the drying jig disassembling apparatus to the drying jig assembling apparatus.

In addition, in the method for manufacturing a honeycomb structure in accordance with the present invention, the honeycomb molded body held by the drying jig is desirably dried while the drying jig is transported one stage by one stage or transported on the drying jigs stacked in multiple stages.

In addition, the drying apparatus desirably includes a drying furnace with an inter-furnace transporting conveyor used for transporting the drying jig.

In addition, the drying apparatus is desirably provided with a plurality of hot-air blowing openings and/or a plurality of cold-air blowing openings on both of sides of the inter-furnace transporting conveyor.

BRIEF DESCRIPTION OF THE DRAWINGS

The embodiments will now be described with reference to the accompanying drawings, wherein like reference numerals designate corresponding or identical elements throughout the various drawings.

DESCRIPTION OF THE EMBODIMENTS

Figure 1:
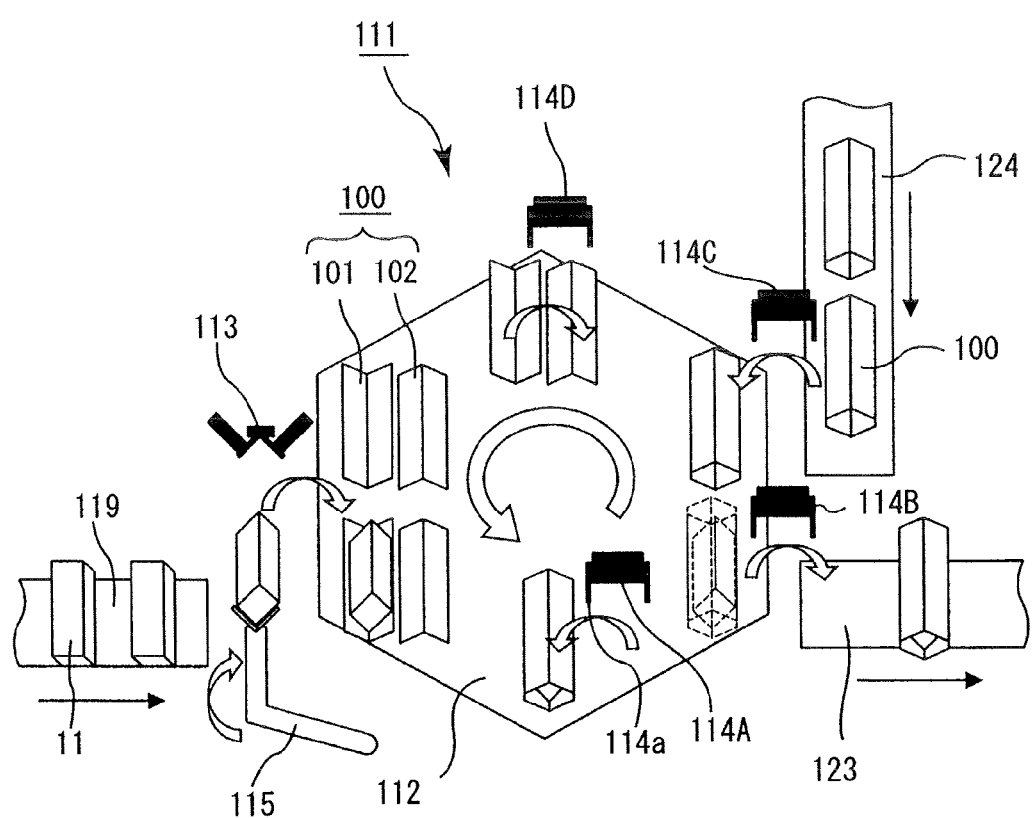
FIG. 1 is a conceptual drawing that schematically shows the outline of a drying jig assembling apparatus in accordance with one embodiment of the present invention.

The embodiments will now be described with reference to the accompanying drawings, wherein like reference numerals designate corresponding or identical elements throughout the various drawings.

The drying jig assembling apparatus in accordance with embodiments of the present invention includes a robot arm; and a movable table for placing a drying jig that holds a ceramic molded body upon drying the ceramic molded body thereon.

The drying jig assembling apparatus is configured to make the drying jig hold the ceramic molded body upon the movable table.

The drying jig is either of a drying jig configured by two or more separate jigs, any of the separate jigs including a fixing member that integrates the separate jigs, or a drying jig formed by one openable jig, including a fixing member for maintaining a closed state.

The drying jig assembling apparatus further includes a molded body mounting mechanism that mounts the ceramic molded body at a predetermined position of the drying jig placed on the movable table by using the robot arm; and a ceramic molded body holding mechanism capable of moving the fixing member after the drying jig is integrated or put in the closed state so that the drying jig is maintained in a state holding the ceramic molded body.

The drying jig assembling apparatus in accordance with the embodiments of the present invention which includes a robot arm and a movable table automatically carries out holding of a ceramic molded body on a drying jig so that the ceramic molded body tends to be held on the drying jig efficiently without the need for manual labor.

The drying jig disassembling apparatus in accordance with embodiments of the present invention includes a robot arm; and a movable table for placing a drying jig that holds a ceramic molded body upon drying the ceramic molded body thereon.

The drying jig disassembling apparatus is configured to take out the ceramic molded body held by the drying jig upon the movable table.

The drying jig is either of a drying jig configured by two or more separate jigs, any of the separate jigs including a fixing member that integrates the separate jigs, or a drying jig formed by one openable jig, including a fixing member for maintaining a closed state.

The disassembling apparatus further includes a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

The drying jig disassembling apparatus in accordance with the embodiments of the present invention which includes a robot arm and a movable table automatically carries out disassembling of a drying jig on which a ceramic molded body is held and a taking out of the ceramic molded body from the drying jig so that the ceramic molded body tends to be taken out of the drying jig efficiently without the need for manual labor.

The drying jig circulating apparatus in accordance with embodiments of the present invention includes a drying jig assembling apparatus including a robot arm and a movable table for placing a drying jig that holds a ceramic molded body upon drying the ceramic molded body thereon. The drying jig assembling apparatus is configured to make the drying jig hold the ceramic molded body upon the movable table.

The drying jig circulating apparatus further includes a drying apparatus for drying the ceramic molded body held by the drying jig; a drying jig disassembling apparatus including a robot arm and a movable table for placing a drying jig that holds a ceramic molded body upon drying the ceramic molded body thereon, the drying jig disassembling apparatus configured to take out the ceramic molded body held by the drying jig upon the movable table; and a drying jig circulating conveyor for transporting the drying jig from which the ceramic molded body has been taken out by the drying jig disassembling apparatus to the drying jig assembling apparatus.

The drying jig is either of a drying jig configured by two or more separate jigs, any one of the separate jigs including a fixing member that integrates the separate jigs, or a drying jig formed by one openable jig, including a fixing member for maintaining a closed state.

The drying jig assembling apparatus further includes a molded body mounting mechanism that mounts the ceramic molded body at a predetermined position of the drying jig placed on the movable table by using the robot arm; a ceramic molded body holding mechanism capable of moving the fixing member after the drying jig is integrated or put in the closed state so that the drying jig is maintained in a state holding the ceramic molded body; and a jig delivering mechanism that delivers and receives the drying jig holding the ceramic molded body to and from the drying apparatus.

The drying jig disassembling apparatus further includes a jig receiving mechanism that receives the drying jig holding the ceramic molded body from the drying apparatus; a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

The drying jig circulating apparatus in accordance with the embodiments of the present invention, which includes a drying jig assembling apparatus in accordance with the embodiments of the present invention, a drying apparatus, a drying jig disassembling apparatus in accordance with the embodiments of the present invention and a drying jig circulating conveyor in accordance with the embodiments of the present invention, can automatically carry out a sequence of processes including holding a ceramic molded body on a drying jig, a drying process, taking out the ceramic molded body from the drying jig and transporting the drying jig from which the ceramic molded body has been taken out to the drying jig assembling apparatus; therefore, it may become easier to dry the ceramic molded body efficiently without the need for manual labor, and also to use the drying jig repeatedly.

The drying method of a ceramic molded body in accordance with embodiments of the present invention includes drying the ceramic molded body with the ceramic molded body being held on the drying jig by using a drying jig assembling apparatus including a robot arm and a movable table for placing a drying jig that holds a ceramic molded body upon drying the ceramic molded body thereon. The drying jig assembling apparatus is configured to make the drying jig hold the ceramic molded body upon the movable table.

The drying step is conducted by further using a drying apparatus for drying the ceramic molded body held by the drying jig, and a drying jig disassembling apparatus including a robot arm and a movable table for placing a drying jig that holds a ceramic molded body upon drying the ceramic molded body thereon, the drying jig disassembling apparatus configured to take out the ceramic molded body held by the drying jig upon the movable table.

The drying jig is either of a drying jig configured by two or more separate jigs, any of the separate jigs including a fixing member that integrates the separate jigs, or a drying jig formed by one openable jig, including a fixing member for maintaining a closed state.

The drying jig assembling apparatus further includes a molded body mounting mechanism that mounts the ceramic molded body at a predetermined position of the drying jig placed on the movable table by using the robot arm; a ceramic molded body holding mechanism capable of moving the fixing member after the drying jig is integrated or put in the closed state so that the drying jig is maintained in a state holding the ceramic molded body; and a jig delivering mechanism that delivers and receives the drying jig holding the ceramic molded body to and from the drying apparatus.

The drying jig disassembling apparatus further includes a jig receiving mechanism that receives the drying jig holding the ceramic molded body from the drying apparatus; a jig releasing mechanism capable of moving the fixing member in such a manner that the held state of the ceramic molded body maintained by the drying jig placed on the movable table is released; and a molded body taking-out mechanism that takes out the ceramic molded body held by the drying jig by using the robot arm.

In the drying method of a ceramic molded body in accordance with the embodiments of the present invention, since the drying process is carried out by using the drying jig assembling apparatus in accordance with the embodiments of the present invention, the drying apparatus and the drying jig disassembling apparatus in accordance with the embodiments of the present invention, it may become easier to automatically carry out a sequence of processes including holding a ceramic molded body on the drying jig, a drying process and taking out the ceramic molded body from the drying jig, and consequently to dry the ceramic molded body efficiently without the need for manual labor.

The method for manufacturing a honeycomb structure in accordance with embodiments of the present invention includes producing a pillar-shaped honeycomb molded body having a large number of cells longitudinally placed in parallel with one another with a cell wall therebetween by molding a ceramic raw material; drying the honeycomb molded body in a state held by a drying jig; and firing the dried honeycomb molded body so that a honeycomb structure including a honeycomb fired body is manufactured.

The drying jig used in the method is either of a drying jig configured by two or more separate jigs, any of the separate jigs including a fixing member that integrates the separate jigs, or a drying jig formed by one openable jig, including a fixing member for maintaining a closed state.

The drying of the honeycomb molded body is carried out by using a drying jig assembling apparatus including a robot arm and a movable table for placing a drying jig that holds a honeycomb molded body upon drying the honeycomb molded body thereon, the drying jig assembling apparatus configured to make the drying jig hold the honeycomb molded body upon the movable table; a drying apparatus for drying the honeycomb molded body held by the drying jig; and a drying jig disassembling apparatus including a robot arm and a movable table for placing a drying jig that holds a honeycomb molded body upon drying the honeycomb molded body thereon, the drying jig disassembling apparatus configured to take out the honeycomb molded body held by the drying jig upon the movable table.

The drying jig assembling apparatus used in the method further includes a molded body mounting mechanism that mounts the honeycomb molded body at a predetermined position of the drying jig placed on the movable table by using the robot arm; a honeycomb molded body holding mechanism capable of moving the fixing member after the drying jig is integrated or put in the closed state so that the drying jig is maintained in a state holding the honeycomb molded body; and a jig delivering mechanism that delivers and receives the drying jig holding the honeycomb molded body to and from the drying apparatus.

The drying jig disassembling apparatus used in the method further includes a jig receiving mechanism that receives the drying jig holding the honeycomb molded body from the drying apparatus; a jig releasing mechanism capable of moving the fixing member in such a manner that the held state of the ceramic molded body maintained by the honeycomb molded body placed on the movable table is released; and a molded body taking-out mechanism that takes out the honeycomb molded body held by the drying jig by using the robot arm.

In the method for manufacturing a honeycomb structure in accordance with the embodiments of the present invention, since the drying jig assembling apparatus in accordance with the embodiments of the present invention, the drying apparatus and the drying jig disassembling apparatus in accordance with the embodiments of the present invention are used for drying the honeycomb molded body, it may become easier to automatically carry a sequence of processes including holding a honeycomb molded body on the drying jig, a drying process and taking out the honeycomb molded body from the drying jig, and consequently to manufacture the honeycomb structure efficiently without the need for manual labor.

In the present specification, the robot arm refers to an arm that has active joints provided with motors and the like, an arm that has inactive joints without motors and the like, or an arm with a combination of active joints and inactive joints.

First, the drying jig assembling apparatus according to the embodiment of the present invention will be described.

Figure 2:
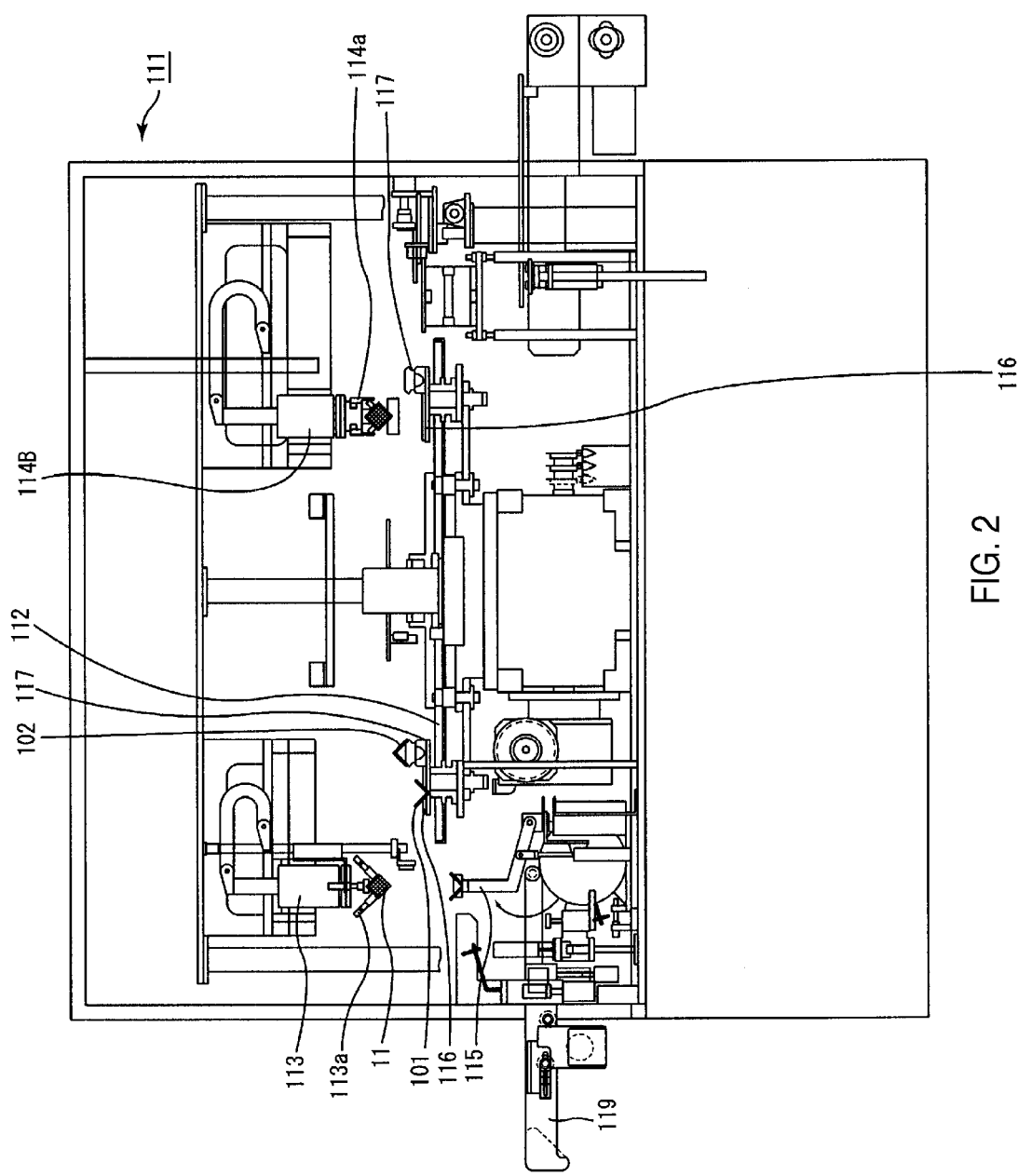
FIG. 2 is a front view of the drying jig assembling apparatus in accordance with one embodiment of the present invention.
Figure 3A:
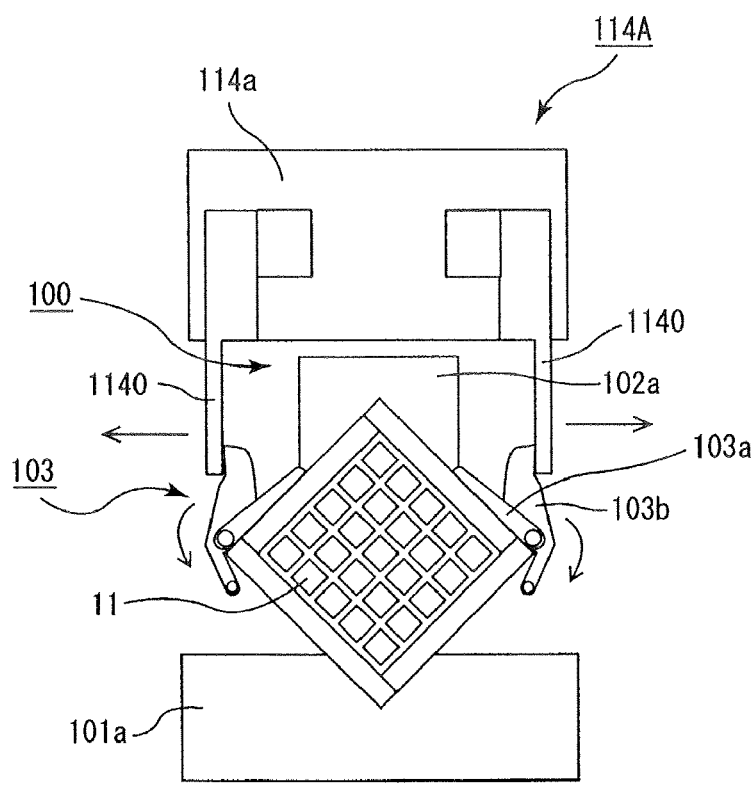
FIGS. 3A and 3B each is a front view showing a robot arm in accordance with one embodiment of the present invention which is allowed to function as a ceramic molded body holding mechanism and the jig releasing mechanism, and a drying jig which is subject to operation in accordance with one embodiment of the present invention.
Figure 3B:
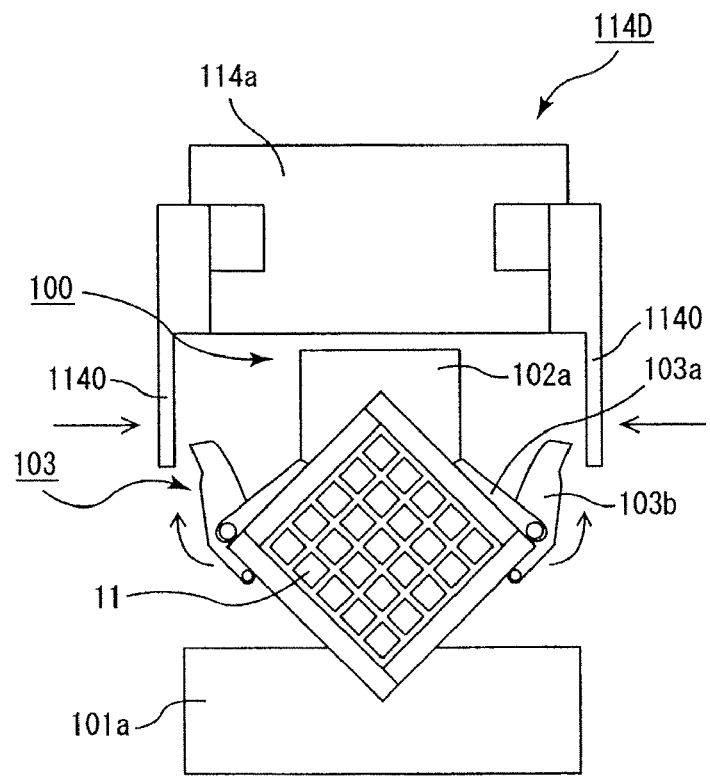

FIG. 1 is a conceptual drawing that schematically shows the outline of the drying jig assembling apparatus in accordance with one embodiment of the present invention, and FIG. 2 is a front view of the drying jig assembling apparatus in accordance with one embodiment of the present invention. FIGS. 3A and 3B each is a front view showing a robot arm in accordance with one embodiment of the present invention which is allowed to function as a ceramic molded body holding mechanism and the jig releasing mechanism, and a drying jig which is subject to operation in accordance with one embodiment of the present invention.

As shown in FIG. 1, a drying jig assembling apparatus 111 includes one robot arm 113, four robot arms 114(114A to 114D) and a movable table 112 on which a drying jig 100 that holds a ceramic molded body 11 is placed. Here, the drying jig 100 is configured by two separable jigs, that is, a lower jig 101 and an upper jig 102.

This drying jig assembling apparatus 111 automatically carries out a process in which the ceramic molded body 11 is placed between the upper jig 102 and the lower jig 101 with the lower jig 101 fixed to the upper jig 102 by using a fixing member.

The following description will discuss the drying jig assembling apparatus 111 in detail.

As shown in FIGS. 1 and 2, the drying jig assembling apparatus 111 has the robot arms 113 and 114, and also has the movable table 112. The robot arm 113 is provided with a suction mechanism, and has a function for suction-holding and transporting the ceramic molded body 11 by this mechanism, and the robot arms 114, on the other hand, have grabbing mechanisms, and exert functions such as transporting, assembling (fixing) and disassembling the drying jig 100 by using these mechanisms.

Therefore, in the drying jig assembling apparatus 111, the robot arm 113 is allowed to function as a molded body mounting mechanism.

In the drying jig assembling apparatus 111, the robot arms 113 and 114 have the above-mentioned mechanisms; however, each of the robot arms 113 and 114 may have both of the suction mechanism and the grabbing mechanism, or may have either one of the mechanisms.

Upon assembling (fixing) the drying jig 100, first, the robot arm 114A allows a hand 114a to descend so that each of two grabbing portions 1140 forming the hand 114a is located on the outside of each of two pressing members 103b of the upper jig 102; thus, each of the grabbing portions 1140 is positioned near the outside of each of the pressing members 103b. Thereafter, the grabbing portions 1140 are shifted in narrowing directions, while the pressing members 103b are allowed to fall inward (in approaching directions to fixing members 103a), to grab the upper jig 102, and after the upper jig 102 has been moved on the lower jig 101 and mounted on the lower jig 101, the grabbing portions 1140 are shifted outward as shown in FIG. 3A. Thus, the pressing members 103b rotate in the direction shown by the arrow, due to a pressing force of the spring so that the lower jig 101 is firmly fixed to the upper jig 102; thus, the drying jig 100 is put in a state (a fixed state) holding the ceramic molded body 11. Therefore, in the drying jig assembling apparatus 111, the robot arm 114A is allowed to function as a ceramic molded body holding mechanism.

In contrast, upon disassembling the drying jig 100, the robot arm 114D allows a hand 114a to descend so that each of two grabbing portions 1140 forming the hand 114a is located on the outside of each of two pressing members 103b of the upper jig 102, as shown in FIG. 3B; thus, each of the grabbing portions 1140 is position near the outside of each of the pressing members 103b. Thereafter, the grabbing portions 1140 are shifted in narrowing directions. Thus, the pressing members 103b rotate in the direction shown by the arrow and the drying jig 100 is set to a state (a released state) in which the held state of the ceramic molded body 11 is released so that it becomes possible to disassemble the drying jig 100.

Here, the structure of the drying jig 100 will be described later.

Here, the robot arms 113 and 114 are provided with air cylinders, and thus allowed to move in vertical directions. Here, portions, extended from the cylinders, are engaged with ball screws placed in the horizontal direction, and movements in the horizontal direction are available by moving mechanisms utilizing the ball screws.

In the drying jig assembling apparatus 111, the drying jig 100, transported from the outside by a conveyor 124 with the upper jig 102 and the lower jig 101 being fixed thereto, is first mounted on a lower jig mounting member 116 on the movable table 112 by a robot arm 114C. Moreover, as the movable table 112 rotates, the upper jig 102 and the lower jig 101 are disassembled by the robot arm 114D through the aforementioned method so that the upper jig 102 is mounted on an upper jig mounting member 117. Here, the movable table 112 intermittently repeats rotating and stopping operations. In FIG. 1, the lower jig mounting member 116 and the upper-jig mounting member 117 are omitted.

As shown in FIG. 2, a groove having a "V" shape in its cross section with a predetermined length is formed on one portion of the lower-jig mounting member 116 so that the lower jig 101 is placed thereon, and the upper-jig mounting member 117, installed next to this, has a short rail shape so that the upper jig 102 is placed thereon. Here, the lower jig 101 is placed on the lower-jig mounting member 116 in such a manner that a ceramic molded body 11 is mounted thereon, while the upper jig 102 is placed on the upper-jig mounting member 117 in such a manner that the upper jig 102, as it is, is mounted on the lower jig 101.

Moreover, in the drying jig assembling apparatus 111, a molded body receiving unit 115 is installed on an end portion of a molded body induction conveyor 119, and when the movable table 112 rotates to allow a pair of the upper jig 102 and the lower jig 101 to come closer to the molded body induction conveyor 119, the molded body receiving unit 115 receives the ceramic molded body 11 that has been transported by the molded body induction conveyor 119 from the outside, and raises the ceramic molded body 11 by rotating one end of the molded body receiving unit 115 as the center of rotation, so that the side face of the ceramic molded body 11 is allowed to make an angle of almost 45° as shown in FIGS. 1 and 2.

The hand 113a of the robot arm 113 suction-holds the ceramic molded body 11 thus raised by the molded body receiving unit 115 by utilizing a suction mechanism, and after having moved above the lower jig 101 mounted on the lower-jig mounting member 116, it descends to mount the ceramic molded body 11 on the lower jig 101.

Thereafter, when the movable table 112 rotates, the robot arm 114A is allowed to grab the upper jig 102, and shifted above the lower jig 101 on which the ceramic molded body 11 is mounted so that the upper jig 102 is placed on the lower jig 101 in a manner so as to cover the ceramic molded body 11, with the fixing member 103 (see FIGS. 4A, 4B) being set to a fixed state. Thus, the ceramic molded body 11 is surrounded by the drying dig 100, and fixed therein.

The drying jig 100 holding the ceramic molded body 11 is placed on a conveyor 123 by a robot arm 114B, and transported to the next process (for example, drying process).

Specific examples of the molded body induction conveyor 119 and the conveyors 123, 124 installed in the drying jig assembling apparatus include: belt conveyors, chain conveyors, roller conveyors and the like.

The drying jig 100 to be used in the drying jig assembling apparatus 111 is either a drying jig configured by two or more separated jigs, any of the separate jigs including a fixing member that integrates the separate jigs, or a drying jig formed by one openable jig, including a fixing member that is used for maintaining a closed state.

Referring to the drawings, the following description will discuss the drying jig of this kind further in detail.

Figure 4A:
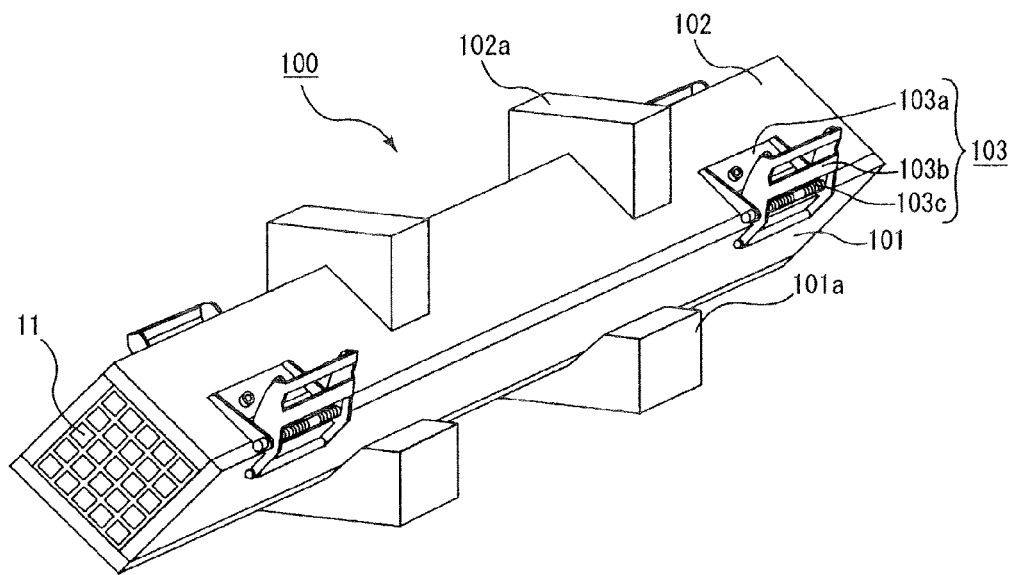
FIG. 4A is a perspective view that schematically shows one example of a drying jig in accordance with one embodiment of the present invention.
Figure 4B:
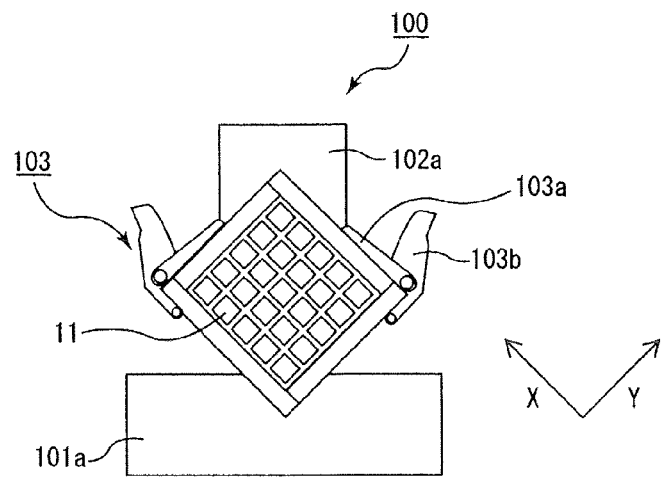
FIG. 4B is a front view of the drying jig in accordance with one embodiment of the present invention shown in FIG. 4A.

FIG. 4A is a perspective view that schematically shows one example of the drying jig in accordance with one embodiment of the present invention, and FIG. 4B is a front view of the drying jig in accordance with one embodiment of the present invention shown in FIG. 4A. Here, FIGS. 4A and 4B show a drying jig configured by two separated parts, that is, an upper jig and a lower jig, with a fixing member that integrally fixes the two jigs to the upper jig.

The drying jig 100 is configured by two jigs, that is, an upper jig 102 formed by joining the longer sides of two thin elongated plate members to each other so that the main faces form a right angle and a lower jig 101 having a similar shape. As shown in FIGS. 4A, 4B, a fixing member 103, used for fixing the upper jig 102 and the lower jig 101 that have been combined, is attached to the upper jig 102.

The fixing member 103 may be attached to either the upper jig 102 or the lower jig 101; however, it is desirably attached to the upper jig 102 from the viewpoint of convenience upon separating and fixing the two jig members (upper jig 102 and lower jig 101).

The fixing member 103 is configured by a fixing portion 103a that is fixed to the plate member by using a screw and a pressing portion 103b that is pivotally attached to the fixing portion 103a through a spring 103c. The fixing member 103, shown in FIGS. 4A, 4B, is allowed to have two states, that is, a fixed state in which the pressing portion 103b presses the lower jig 101 so as to fix the lower jig 101 to the upper jig 102, and a released state in which the pressing portion 103b and the fixing portion 103a are allowed to fall almost in the same direction. In the fixing member 103, when the upper end of the pressing portion 103b in its released state is moved outward (in a separating direction from the fixing member 103a) by a predetermined distance, the released state is switched to the fixed state so that the lower jig 101 is firmly pressed and fixed; in contrast, when the upper end of the pressing portion 103*b* in its fixed state is moved inward (in an approaching direction to the fixing member 103*a*) by a predetermined distance, the fixed state is switched to the released state. With respect to the mechanism used for fixing the upper jig 102 and the lower jig 101 to each other, not limited to the above-mentioned pressing system by the use of a spring, for example, a hook of a latch type or the like may be used.

Moreover, the plate-shaped mounting member 102*a* on which the "V"-shaped groove is formed is attached to the upper jig 102 so that the "V"-shaped groove is fitted to a corner portion of the outer wall face of the upper jig 102.

Moreover, the mounting member 101*a* is also attached to the lower jig 101 in the same manner.

By installing these mounting members, each of the jigs tends to be mounted on the movable table 112 or the like in a stable manner, if necessary.

Here, each of the mounting members 101*a* and 102*a* has a flat face on the side opposite to the face on which the "V"-shaped groove is formed. For this reason, drying jigs 100, each having the lower jig 101 and the upper jig 102 fixed thereto, tends to be mutually stacked one after another.

Moreover, a concave section to which the mounting member 102*a* of the upper jig 102 is fitted may be formed on the bottom face of the mounting member 101*a* of the lower jig 101, and, in this case, the lower jig 101 and the upper jig 102 tend to be stacked one after another in a more stable manner.

Here, the upper jig 102 and the lower jig 101 that configure the drying jig 100 can be separated from each other so as to be respectively handled independently. Even when the upper jig 102 and the lower jig 101 are separable, it may become easier to positively fix one jig to another by the fixing member attached to the upper jig 102 or the lower jig 101. The grabbing force of the fixing member is set to a level that tends to sufficiently suppresses a pressure to be imposed onto the fixed drying jig in which the upper jig 102 and the lower jig 101 are integrated, by warping or the like occurring in the honeycomb molded body as the drying process progresses.

Moreover, the drying jig may be one openable jig with a fixing member used for maintaining a closed state attached thereto.

With respect to the drying jig of this kind, for example, a structure is proposed in which one of the fixing members 103 that are attached symmetrically at horizontal positions when the upper jig 102 and the lower jig 101 are overlapped with each other as shown in FIGS. 4A, 4B is replaced by a hinge mechanism so that the upper jig 102 and the lower jig 101 are rotatably supported to each other by the hinge mechanism.

With respect to the material for the upper jig and the lower jig configuring the drying jig, although not particularly limited as long as it exerts a heat resistant property at the drying treatment temperature, for example, materials such as epoxy resin, polycarbonate, polystyrene, polyethylene terephthalate, polyamideimide and polyphenylene sulfide may be used.

Moreover, although not shown in FIGS. 4A, 4B, an elastic member for absorbing moisture may be attached to each of the inner wall faces (faces that are made in contact with the ceramic molded body) of the upper jig and the lower jig configuring the drying jig.

When such an elastic member is attached thereto, moisture evaporated upon drying the ceramic molded body is absorbed by this elastic member so that the drying efficiency of the ceramic molded body can be improved.

With respect to the elastic member, porous elastic members made from a plastic material or rubber material may be used, and more specifically, silicon sponge is desirably used.

In the case where the ceramic molded body to be dried has a square pillar shape, it is desirable that a drying jig having a structure in which, as shown in FIGS. 4A, 4B, the longitudinal direction thereof is horizontally maintained, with diagonal apexes of the square shape on the cross-section perpendicular to the longitudinal direction being aligned on almost the same vertical line, is used as such a drying jig described above.

Referring to FIG. 4B, the reason for this structure is explained supposing that in the almost "L" shape formed on the cross-section perpendicular to the longitudinal direction of the lower jig 101, the bent point of the almost "L" shape forms an origin, with the respective sides of the almost "L" shape being defined as X-axis and Y-axis.

In the case where the lower jig is inclined so that diagonal apexes of the square shape on the cross-section perpendicular to the longitudinal direction of the ceramic molded body are aligned on almost the same vertical line, that is, in the case where the lower jig is inclined so that the smaller of the angles made by X-axis and Y-axis to the horizontal direction is set to almost 45°, even if, upon mounting the ceramic molded body on the lower jig, the ceramic molded body is placed at a position other than the predetermined position (a position at which the square shape on the cross-section perpendicular to the longitudinal direction of the ceramic molded body is offset in the X-axis or Y-axis direction), the mounted ceramic molded body is allowed to move due to the inclined X-axis or Y-axis so that one apex of the square shape is overlapped with the origin; thus, the mounted position is corrected to the predetermined position. In other words, the ceramic molded body is moved to the lowest position on the lower jig by gravity. Consequently, even when the upper jig is superposed thereon, it may become easier to prevent damages and the like from occurring in the ceramic molded body.

In contrast, in the case where the X-axis or the Y-axis is set in the horizontal direction, that is, in the case where the side face of the lower jig is set in the horizontal direction, diagonal apexes of the square shape on the cross-section perpendicular to the longitudinal direction of the ceramic molded body are not aligned on the same vertical line.

In the case where a ceramic molded body is mounted on such a lower jig, if, upon mounting the ceramic molded body on the lower jig, the ceramic molded body is placed at a position other than the predetermined position, the ceramic molded body is not naturally moved to the predetermined position since one of the side faces of the lower jig is set in the horizontal direction, and the other side face thereof is set in the vertical direction; consequently, it is necessary to carry out a positional offset correcting process after the ceramic molded body has been mounted, and in the case where the positional offset is left uncorrected, the ceramic molded body tends to be damaged upon superposing the upper jig thereon.

Moreover, in the case where the X-axis and Y-axis are inclined with angles other than almost 45° to the horizontal direction (more specifically, for example, in the case where the X-axis is inclined with an angle of almost 60° to the horizontal direction, with the Y-axis being inclined with an angle of almost 30° to the horizontal direction), the side faces of the lower jig are inclined; therefore, even if, upon mounting a ceramic molded body on the lower jig, the mounted position of the ceramic molded body has an offset, the positional offset is naturally corrected.

However, in this case, in each of the upper and lower jigs, when the cross section perpendicular to the longitudinal direction is divided by the vertical straight line, the divided shapes do not form laterally symmetrical shapes. For this reason, each time the jigs are overlapped with each other, an operation for confirming the directions of the jigs is required, and consequently, this arrangement is disadvantageous in that the drying jig assembling apparatus requires an additional function for confirming the directions of the jigs.

Therefore, the drying jig in accordance with the embodiments of the present invention is desirably provided with the above-mentioned arrangement.

Furthermore, when the ceramic molded body is held by the drying jigs in such a manner that diagonal apexes of the square shape on the cross section perpendicular to the longitudinal direction of the ceramic molded body are aligned on almost the same vertical line, the upper jig is positioned to cover just the upper half of the drying jig.

For this reason, this arrangement is suitable for mounting the ceramic molded body and the upper jig on the lower jig, as well as for lifting them from the lower jig, by using a robot arm having a hand with a suction mechanism or the like.

The drying jig assembling apparatus jig in accordance with the embodiments of the present invention having this arrangement may make it easier to automatically carry out a process for holding a ceramic molded body on the drying jig, and also to hold the ceramic molded body efficiently without the need for manual labor.

The following description will discuss a drying jig disassembling apparatus in accordance with the embodiments of the present invention.

Referring to the drawings, the following description will discuss the drying jig disassembling apparatus in accordance with the embodiments of the present invention.

Figure 5:
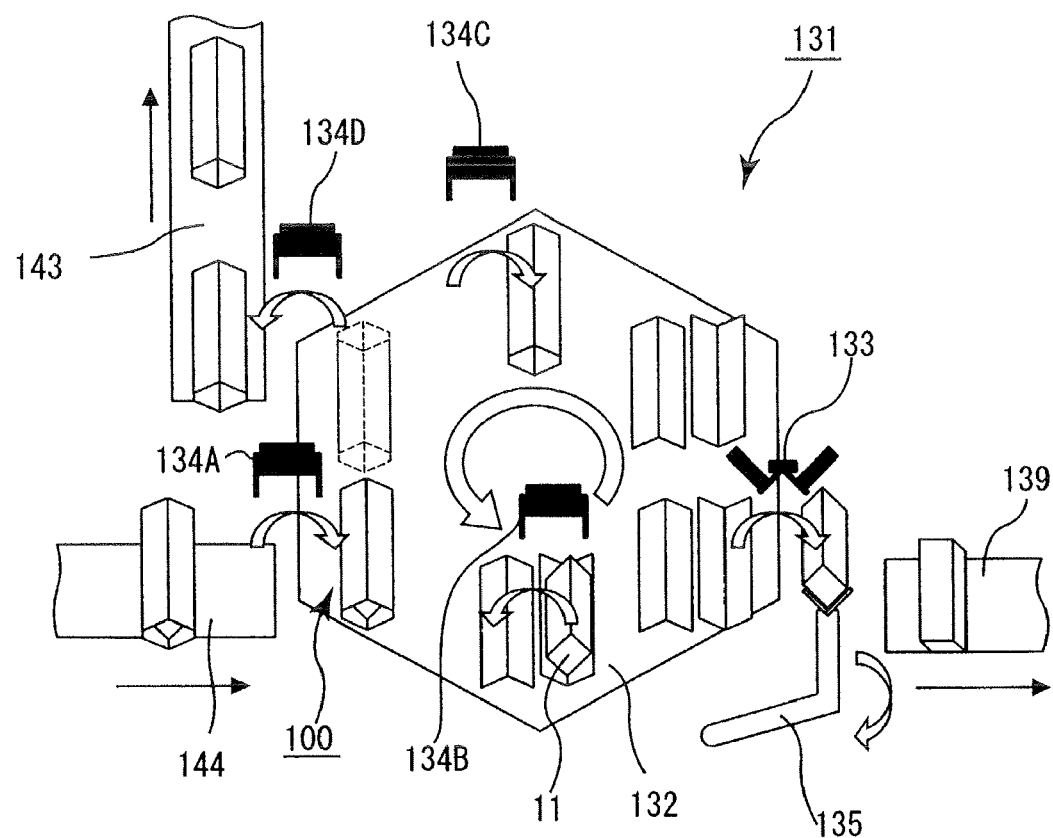
FIG. 5 is a conceptual drawing that schematically shows the outline of a drying jig disassembling apparatus in accordance with one embodiment of the present invention.

FIG. 5 is a conceptual drawing that schematically shows the outline of the drying jig disassembling apparatus in accordance with the embodiment of the present invention.

As shown in FIG. 5, the constituent members of the drying jig disassembling apparatus in accordance with the embodiment of the present invention are almost the same as those constituent members of the drying jig assembling apparatus in accordance with the embodiment of the present invention.

In other words, as shown in FIG. 5, a drying jig disassembling apparatus 131 is provided with one robot arm 133, four robot arms 134 (134A to 134D) and a movable table 132 on which a drying jig 100 that holds a ceramic molded body 11 is placed. Here, the drying jig 100 is configured by two separable jigs, that is, a lower jig 101 and an upper jig 102.

This drying jig disassembling apparatus 131 automatically carries out processes in which: the drying jig 100 in which a ceramic molded body 11 is placed between the upper jig 102 and the lower jig 101, with the upper jig 102 and the lower jig 101 being fixed by using a fixing member 103, is disassembled and the ceramic molded body 11 is taken out of the drying jig 100. Here, the drying jig 100 has already been explained in the description of the drying jig assembling apparatus.

In the drying jig disassembling apparatus 131, the drying jig 100, which has been transported by a conveyor 144, with the upper jig 102 and the lower jig 101 being fixed thereto and the ceramic molded body 11 being held thereon, is first mounted on the movable table 132 by the robot arm 134A, and when the movable table 132 rotates, it is disassembled into the upper jig 102 and the lower jig 101 by the robot arm 134B. In this case, the robot arm 134B makes a pressing member 103b of the fixing member 103 in an open state, and separates the upper jig 102 from the lower jig 101 with the open state being maintained.

Therefore, in the drying jig disassembling apparatus 131, the robot arm 134B functions as the jig opening mechanism.

With respect to the method for separating the upper jig 102 and the lower jig 101 from each other, the same method as the method used in the drying jig assembling apparatus that has already been explained may be used.

Here, the movable table 132 intermittently repeats rotating and stopping operations. In FIG. 5, the upper-jig mounting member and the lower-jig mounting member are omitted, but the structures thereof are the same as those of the upper-jig mounting member 117 and the lower jig mounting member 116 possessed by the drying jig assembling apparatus that has already been explained.

When the movable table 132 rotates, the ceramic molded body 11 on the lower jig 101 is then lifted by the robot arm 133 having a suction mechanism and passed to a molded body receiving unit 135. Therefore, in the drying jig disassembling apparatus 131, the robot arm 133 functions as the molded body taking-out mechanism.

Thereafter, the ceramic molded body 11 that has been passed to the molded body receiving unit 135 is placed on a dried body taking-out conveyor 139 used for transporting the ceramic molded body, and transported to the succeeding process.

Here, in the drying jig 100 (the upper jig 102 and the lower jig 101) that has passed the ceramic molded body 11 to the molded body receiving unit 135, after the movable table 132 has further rotated, the upper jig 102 is mounted on the lower jig 101 by the robot arm 134C, with no ceramic molded body being held thereon, and the lower jig 101 is fixed to the upper jig 102 by the fixing member 103. With respect to the method for fixing the lower jig 101 to the upper jig 102, the same method as the method used in the drying jig assembling apparatus that has already been explained may be used.

Thus, after the movable table 132 has further rotated, the drying jig 100, which is fixed by the fixing member 102, with no ceramic molded body 11 being held thereon, is placed on the conveyor 143 by the robot arm 134D, and carried out from the drying jig disassembling apparatus 131.

In the drying jig disassembling apparatus 131, the robot arms 133 and 134 are provided with air cylinders, and thus allowed to move in vertical directions. Here, portions, extended from the cylinders, are engaged with ball screws placed in the horizontal direction, and movements in the horizontal direction are obtained by moving mechanisms utilizing the ball screws.

Specific examples of the dried body taking-out conveyor 139 and the conveyors 143, 144 installed in the drying jig disassembling apparatus include: belt conveyors, chain conveyors, roller conveyors and the like.

In the case where the ceramic molded body to be dried has a square pillar shape, it is desirable that a drying jig having a structure in which, as shown in FIGS. 4A, 4B, the longitudinal direction thereof is horizontally maintained, with diagonal apexes of the square shape on the cross section perpendicular to the longitudinal direction being aligned on almost the same vertical line, is used as the drying jig used in the drying jig disassembling apparatus in accordance with the embodiment of the present invention.

The reason for this structure is the same as explained in the description of the drying jig assembling apparatus in accordance with the embodiments of the present invention.

In the drying jig disassembling apparatus in accordance with the embodiment of the present invention having the above-mentioned structure, the taking-out process of the ceramic molded body from the drying jig tends to be carried out automatically so that it may become easier to take out the ceramic molded body from the drying jig efficiently without the need for manual labor.

The following description will discuss a drying jig circulating apparatus in accordance with the embodiments of the present invention.

Figure 6:
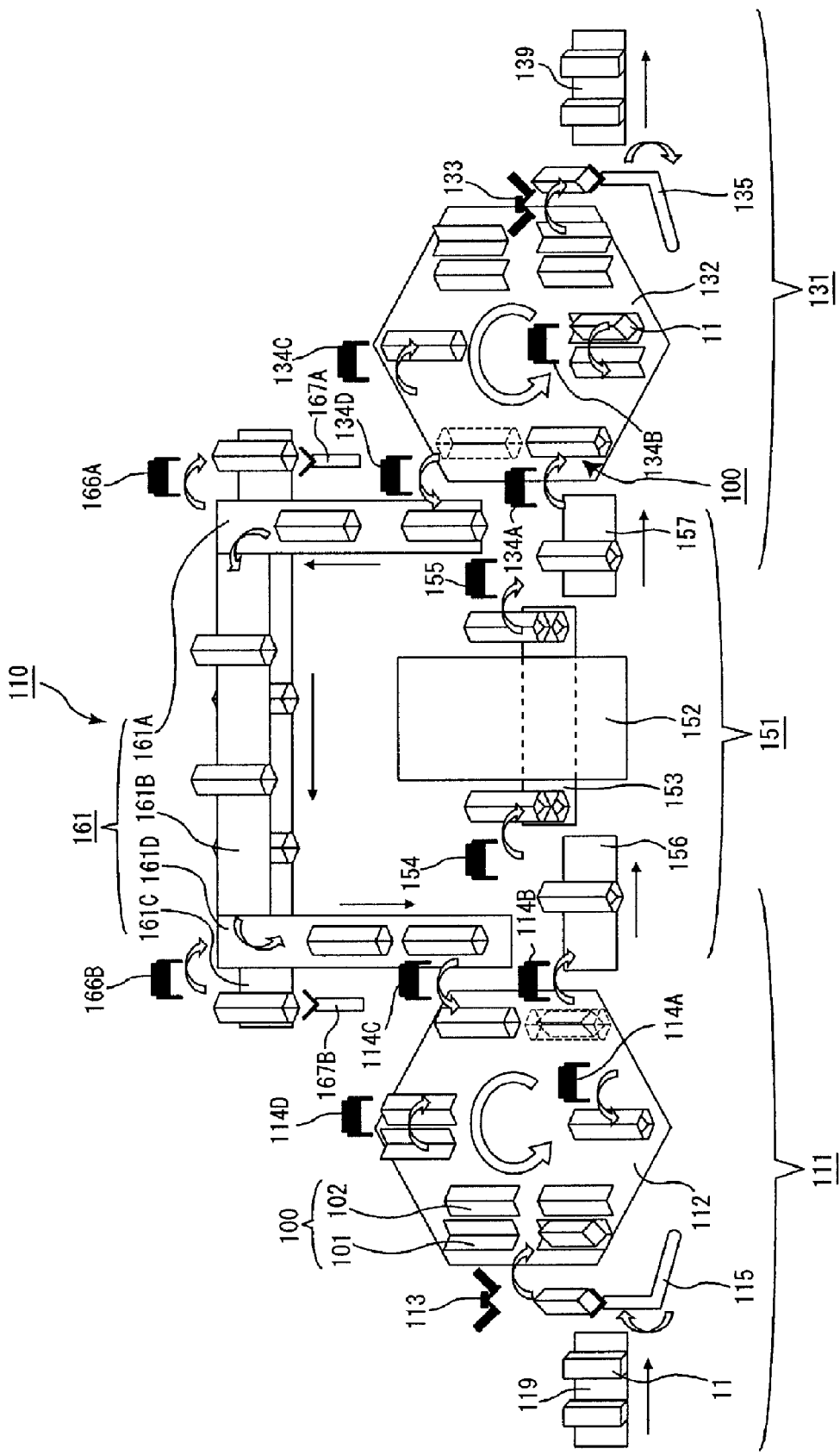
FIG. 6 is a conceptual drawing that schematically shows the outline of another drying jig circulating apparatus in accordance with one embodiment of the present invention.

Referring to FIG. 6, the following description will discuss a drying jig circulating apparatus in accordance with one embodiment of the present invention.

FIG. 6 is a conceptual drawing that schematically shows the outline of the drying jig circulating apparatus in accordance with one embodiment of the present invention.

The drying jig circulating apparatus 110 is provided with: a drying jig assembling apparatus 111, a drying apparatus 151, a drying jig disassembling apparatus 131 and a drying jig circulating conveyor 161.

With respect to the drying jig assembling apparatus 111 and the drying jig disassembling apparatus 131, the drying jig assembling apparatus in accordance with the embodiments of the present invention and the drying jig disassembling apparatus in accordance with the embodiments of the present invention, which have already been explained, can be used respectively; therefore, the detailed description thereof is omitted.

In this case, the embodiment of the drying jig circulating apparatus will be explained in accordance with the flow of the ceramic molded body 11.

In the drying jig circulating apparatus 110 in accordance with the embodiment of the present invention, ceramic molded bodies 11, transported by the molded body induction conveyor 119, are mounted on the drying jig 100 transported by a circulating conveyor 161D (conveyor 124 in FIG. 1) in the drying jig assembling apparatus 111.

The drying jig 100 on which the ceramic molded bodies 11 have been held is placed on a induction conveyor 156 (conveyor 123 in FIG. 1) of a drying apparatus 151 by the robot arm 114B, and after having been dried by hot air inside a drying furnace 152, this is further transported to the drying jig disassembling apparatus 131 by a taking-out conveyor 157 (conveyor 144 in FIG. 5). Here, the drying process of the ceramic molded body 11 inside the drying furnace 152 is carried out, with the drying jigs 100 being stacked in two stages.

In the drying jig circulating apparatus 110, the robot arm 114B is allowed to function as the jig delivering mechanism.

Next, the ceramic molded bodies 11 that have been dried are shifted to the drying jig disassembling apparatus 131 by the robot arm 134A, and then taken out of the drying jig 11, and carried out to the next process by the dried body taking-out conveyor 139.

The drying jig 100 from which the ceramic molded bodies 11 have been taken out is placed on a circulating conveyor 161A (conveyor 143 in FIG. 5) by the robot arm 134D, with no ceramic bodies 11 being held thereon and with the upper jig 102 and the lower jig 101 being fixed to one another. Then, the drying jig 100 is returned to the drying jig assembling apparatus 111 by the drying jig circulating conveyor 161.

The following description will discuss the drying apparatus 151 that is one of constituent components of the drying jig circulating apparatus 110.

Figure 7:
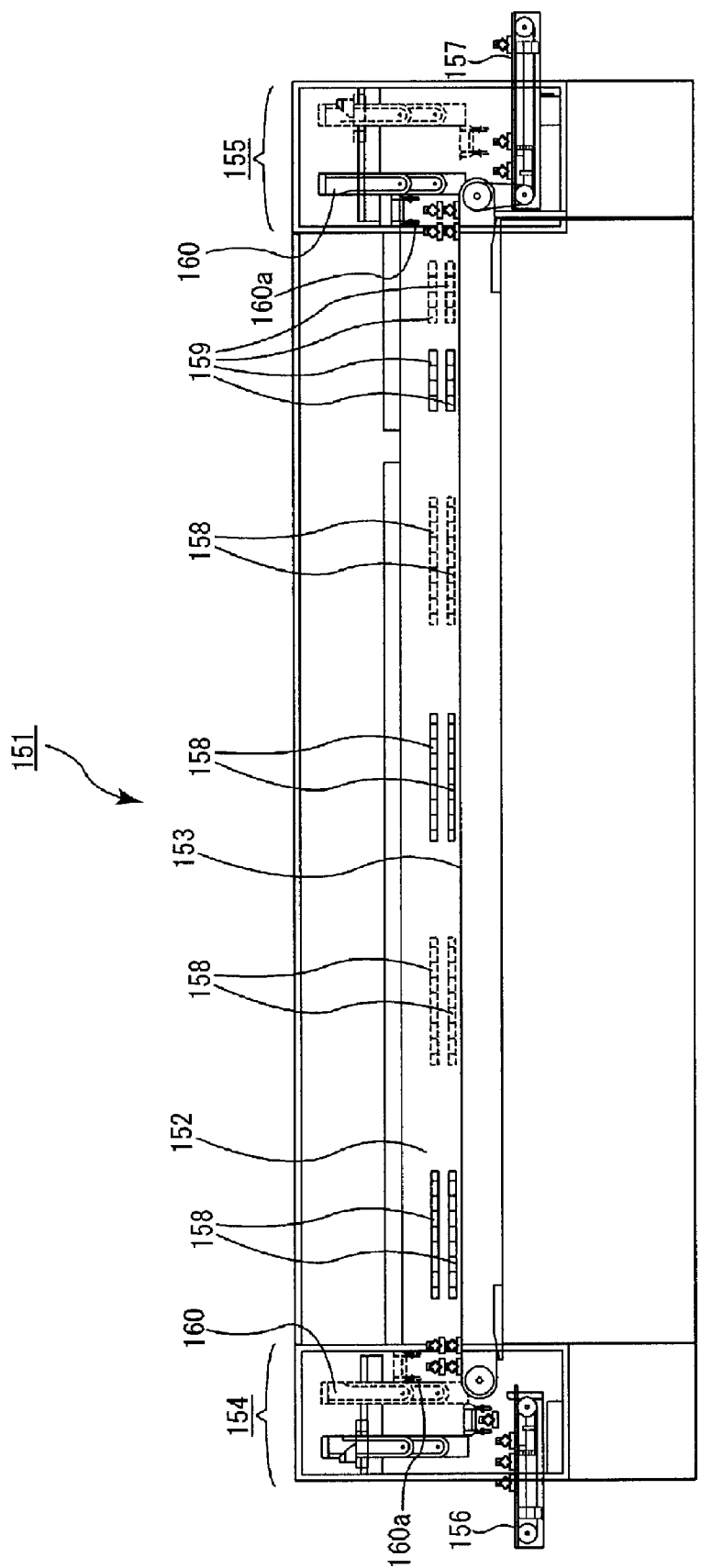
FIG. 7 is a cross-sectional view that shows a drying apparatus that is a constituent component of the drying jig circulating apparatus in accordance with one embodiment of the present invention.

FIG. 7 is a cross-sectional view that shows a drying apparatus that is one of constituent components of the drying jig circulating apparatus in accordance with one embodiment of the present invention.

As shown in FIGS. 6 and 7, the drying apparatus 151 includes a induction conveyor 156 that receives the drying jig 100 from the drying jig assembling apparatus 111, a drying jig stacking device 154 used for stacking drying jigs into multiple stages (two stages in the drying apparatus 151), a drying furnace 152 having an inter-furnace transporting conveyor 153 that transports the drying jig 100, a drying jig stage-disassembling device 155 used for disassembling stacked drying jigs with multiple stages into each stage and a taking-out conveyor 157 that delivers the drying jigs to the drying jig disassembling apparatus.

The drying furnace 152, which includes the inter-furnace transporting conveyor 153 used for transporting the drying jig 100, is also provided with a plurality of hot-air blowing openings 158 that are placed on both of the sides of the inter-furnace transporting conveyor 153. Here, the hot-air blowing openings 158 are placed in such positions that hot air is blown onto end faces of each of the ceramic molded bodies 11 held on the drying jig 100. When the ceramic molded body is a honeycomb molded body, the position thereof with such a height allows hot air to flow into the cells of the honeycomb molded body, making it easier to efficiently dry the honeycomb molded body uniformly.

Moreover, cold-air blowing openings 159 are placed at positions closer to the outlet from the hot-air blowing openings 158 in the drying furnace 152 on both of the sides of the inter-furnace transporting conveyor 153 so that cold air is blown onto end faces of each of the ceramic molded bodies 11.

The drying jig stacking device 154 is configured by a robot arm 160 having a grabbing mechanism, and the drying jig 100, transported by the induction conveyor 156, is grabbed by the hand 160a of the robot arm 160, and placed on the inter-furnace transporting conveyor 153 or another drying jig 100 placed on the inter-furnace transporting conveyor 153.

Moreover, the drying jig stage-disassembling device 155 also has the same structure as the drying jig stacking device 154, and in this device, the drying jig 100, transported by the inter-furnace transporting conveyor 153, is grabbed by the robot arm 160, and placed on the taking-out conveyor 157.

Here, with respect to the robot arm 160, not limited to the one having the grabbing mechanism, it may have a suction mechanism in place of the grabbing mechanism, or may have both the suction mechanism and the grabbing mechanism.

In the drying apparatus 151, when the drying jig 100 holding the ceramic molded body 11 is received from the drying jig assembling apparatus 111, the drying jig 100 is transported to the drying jig stacking device 154 by the induction conveyor 156, and carried to and placed on the inter-furnace transporting conveyor 153 in the drying jig stacking device 154 by the robot arm 160. Here, the induction conveyor 156 is the same as the conveyor 123 in FIG. 1.

Since the drying jigs 100 are stacked on the inter-furnace transporting conveyor 153 in two stages as described above, the inter-furnace transporting conveyor 153 is moved intermittently. In other words, the inter-furnace transporting conveyor is stopped while the drying jigs 100 are being stacked by the robot arm 160, and moved in periods of time other than stacking of the drying jigs 100.

Thereafter, the ceramic molded bodies held on the drying jigs 100 are dried by hot air at a predetermined temperature inside the drying apparatus 152, and further cooled by cold air to a predetermined temperature. After the drying and cooling processes, the drying jig stage-disassembling device 155 disassembles the stages of the stacked up drying jigs 100 so that each of the drying jigs 100 is placed on the taking-out conveyor 157 one stage by one stage, and then delivered to the drying jig disassembling apparatus 131. Upon disassembling the stages of stacked up drying jigs 100 and placing them on the taking-out conveyor 157, the inter-furnace transporting conveyor is stopped. Consequently, while the inter-furnace transporting conveyor 153 is stopped, the stacking process of the drying jigs and the stage-disassembling process of the drying jigs are respectively carried out at the two ends of the conveyor.

Here, the taking-out conveyor 157 is the same as the conveyor 144 in FIG. 5.

With respect to the drying apparatus installed in the drying jig circulating apparatus in accordance with the embodiments of the present invention, the drying apparatus 151, shown in FIGS. 6 and 7, carries out the drying process with the drying jigs being stacked in two stages; however, in the drying process, it is not necessarily required to stack the drying jigs in two stages, and the drying process may be carried out with the drying jigs being stacked in three or more stages, or may be carried out without mutually stacking the drying jigs.

In the case where the drying process is carried out without mutually stacking the drying jigs, it is not necessary to install the drying jig stacking device and the drying jig stage-disassembling device, and the induction conveyor, the inter-furnace conveyor and the taking-out conveyor may be configured by a single conveyor.

Moreover, the drying apparatus 151 is provided with eight hot-air blowing openings and four cold-air blowing openings with respect to the two sides of the inter-furnace conveyor 153; however, first, with respect to the hot-air blowing openings, the number of the hot-air blowing openings installed in the drying apparatus forming the drying jig circulating apparatus of the present invention is not intended to be limited to eight openings, and the number may be set to one to seven, or may be set to nine or more. Moreover, the hot-air blowing openings are not necessarily required to be placed on the two sides of the inter-furnace transporting conveyor, and may be placed only on one of the sides of the inter-furnace transporting conveyor. However, it is desirable to place the hot-air blowing openings on the two sides of the inter-furnace transporting conveyor, and in this case, the hot-air blowing openings are desirably placed alternately in such a manner that the hot-air blowing openings are not aligned face to face with each other.

With respect to the cold-air blowing openings, the number of the cold-air blowing openings is not intended to be limited to four openings, and the number may be set to one to three, or may be set to five or more. Moreover, the cold-air blowing openings are not necessarily required to be placed on the two sides of the inter-furnace transporting conveyor, and may be placed only on one of the sides of the inter-furnace transporting conveyor. However, it is desirable to place the cold-air blowing openings on the two sides of the inter-furnace transporting conveyor, and in this case, the cold-air blowing openings are desirably placed alternately in such a manner that the cold-air blowing openings are not aligned face to face with each other.

In the drying furnace 152 shown in FIG. 7, the area from which hot air is applied and the area from which cold air is applied are not particularly separated; however, the two areas may be separated from each other by a shutter, a curtain made of cloth, or a partition plate in which an opening that allows the drying jig to pass through is formed.

Moreover, in the drying apparatus 151, the inter-furnace transporting conveyor 153 is formed by a single conveyor, and is designed to transport the drying jigs intermittently; however, the structure of the inter-furnace transporting conveyor is not limited by this structure, and, for example, a structure in which three independent conveyors are disposed from the induction side to the taking-out side so that the conveyors on the induction side and the taking-out side are intermittently moved, with the conveyor in the center being continuously moved, may be used.

Specific examples of the induction conveyor, the taking-out conveyor and the inter-furnace transporting conveyor installed in the drying apparatus include: belt conveyors, chain conveyors, roller conveyors and the like.

The following description will discuss more in detail the drying jig circulating conveyor 161 that configures the drying jig circulating apparatus in accordance with the embodiment of the present invention.

As shown in FIG. 6, the drying jig circulating conveyor 161 is configured by four conveyors (a circulating conveyor 161A, a circulating conveyor 161B, a circulating conveyor 161C, and a circulating conveyor 161D). Here, the circulating conveyor 161B and the circulating conveyor 161C are installed in a two-tiered manner.

Moreover, the drying jig circulating conveyor 161 is provided with robot arms 166A and 166B used for passing and receiving the drying jigs 100 between the circulating conveyors. Each of the robot arms 166A and 166B has a grabbing mechanism used for grabbing a drying jig.

In the drying jig circulating conveyor 161, after a drying jig 100 that holds no ceramic molded body 11 has been received by the circulating conveyor 161A from the drying jig disassembling apparatus 131 through the robot arm 134D, the drying jig 100 is transported toward the drying jig assembling apparatus 111 via the circulating conveyors 161B and 161D or the circulating conveyors 161C and 161D.

More specifically, the drying jig 100 is first transported toward the circulating conveyors 161B, 161C by the circulating conveyor 161A, and is carried to and placed on the circulating conveyor 161B or the circulating conveyor 161C by the robot arm 166A. Thereafter, the drying jig 100 is transported toward the circulating conveyor 161D by the circulating conveyor 161B or 161C, and is carried to and placed on the circulating conveyor 161D by the robot arm 166B, and is successively transported to the drying jig assembling apparatus 111 by the circulating conveyor 161D. Here, a drying jig receiving unit 167A used for receiving the drying jig 100 from the circulating conveyor 161A and a drying jig delivering unit 167B used for delivering the drying jig 100 to the circulating conveyor 161D are placed on the two ends of the circulating conveyor 161C, and each of these has a lifting mechanism, and is designed to be capable of moving upward and downward. Here, the drying jig receiving unit 167A and the drying jig delivering unit 167B may be installed, according to need.

In this manner, in the drying jig circulating conveyor 161, since the drying jig 100 is transported from the drying jig disassembling apparatus 131 to the drying jig assembling apparatus 111, the drying jig 100 tends to be used repeatedly.

As described above, the drying jig circulating conveyor 161 is provided with four conveyors, and has two routes of the transporting passages for the drying jig 100 (i.e., circulating conveyor 161A→circulating conveyor 161B→circulating conveyor 161D and circulating conveyor 161A→circulating conveyor 161C→circulating conveyor 161D), and the structure having these two kinds of routes is advantageous from the viewpoint of miniaturizing the drying jig circulating apparatus.

With respect to the circulating conveyors configuring the drying jig circulating apparatus in accordance with the embodiments of the present invention, it is not necessarily required to provide two routes of the transporting passages, and, for example, it may be formed by only one conveyor with only one route of the transporting passage. Moreover, the circulating conveyors may be provided with three or more routes of the transporting passages.

Specific examples of the drying jig circulating conveyors include: belt conveyors, chain conveyors, roller conveyors and the like. In the case where the drying jig circulating conveyors are provided with a plurality of kinds of circulating conveyors, the kinds of the respective circulating conveyors may be the same or may be different from each other.

In the drying jig circulating apparatus in accordance with the embodiments of the present invention having the above-mentioned structure, since a sequence of processes, such as a process used for holding ceramic molded bodies on the drying jig, a drying process, a process used for taking out the ceramic molded bodies from the drying jig and a process used for returning the drying jig from which the ceramic molded bodies have been taken out to the drying jig assembling apparatus, can be automatically carried out, it may become easier to dry ceramic molded bodies efficiently without the need for manual labor, and also to use the drying jig repeatedly.

The following description will discuss a drying method of a ceramic molded body in accordance with the embodiments of the present invention.

In the drying method of a ceramic molded body in accordance with the embodiments of the present invention, the ceramic molded body is dried by using the drying jig assembling apparatus in accordance with the embodiments of the present invention, the drying apparatus and the drying jig disassembling apparatus in accordance with the embodiments of the present invention.

The following description will explain desirable drying conditions, etc., by exemplifying a process in which a pillar-shaped honeycomb molded body having a large number of cells longitudinally placed in parallel with one another with a cell wall therebetween is used as the ceramic molded body to be dried.

Of course, the object to be dried in the drying method in accordance with the embodiments of the present invention is not intended to be limited by the honeycomb molded body, and various kinds of ceramic molded bodies may be used as the object to be dried.

The drying method of the present invention in accordance with the embodiments of the present invention is carried out by using the drying jig assembling apparatus in accordance with the embodiments of the present invention, the drying apparatus, and the drying jig disassembling apparatus in accordance with the embodiments of the present invention; therefore, the drying method is desirably carried out by using a drying jig circulating apparatus in accordance with the embodiments of the present invention of the present invention that includes these apparatuses.

However, it is only necessary for the drying method of in accordance with the embodiments of the present invention to carry out the processes by using the drying jig assembling apparatus in accordance with the embodiments of the present invention, the drying apparatus, and the drying jig disassembling apparatus in accordance with the embodiments of the present invention, and it is not necessarily required to use a drying jig circulating conveyor that is included in the embodiments of the drying jig circulating apparatus. In this case, however, from the viewpoint of improving the work efficiency, the drying jig circulating conveyor is desirably used.

In the drying method in accordance with the embodiments of the present invention, a honeycomb molded body is transported into the drying jig assembling apparatus so that the honeycomb molded body is held on the drying jig in the drying jig assembling apparatus.

With respect to the method for holding the honeycomb molded body by the drying jig in the drying jig assembling apparatus, since it has already been explained in the description of the drying jig assembling apparatus in accordance with the embodiments of the present invention, the description thereof is omitted.

Next, the honeycomb molded body, held by the drying jig, is inducted into the drying apparatus so that the honeycomb molded body is dried by hot air.

In this case, the drying process may be carried out on the drying jig while being transported one stage by one stage, or on the drying jigs stacked in multiple stages such as two stages. From the viewpoint of improving the work efficiency, the drying jigs, stacked in multiple stages, are desirably dried.

With respect to the structure of the drying apparatus, since it has already been explained in the description of the drying jig circulating apparatus in accordance with the embodiments of the present invention, the description thereof is omitted.

With respect to specific drying conditions, although not generally determined since they are changed depending on the size, shape and the like of the honeycomb molded body, normally, the temperature inside the drying furnace is desirably set to at least about 80° C. and at most about 150° C.

When the temperature inside the drying furnace is set within the above-mentioned range, it may becomes easier to dry the honeycomb molded body sufficiently, and also to prevent the binder or the like from being lost due to excessive heating.

Here, the wind velocity of the hot air is desirably set to at least about 5.0 m/s and at most about 50.0 m/s.

When the wind velocity of the hot air is set within the above-mentioned range, the honeycomb molded body tends to be dried in a short time, and even when the drying jigs are stacked in multiple stages, the occurrence of positional deviations in the drying jigs due to hot air is more likely to be prevented.

The period of time during which the honeycomb molded body is allowed to stay inside the drying furnace is desirably set to at least about 10 min and at most about 20 min, and within this time range, the honeycomb molded body tends to be dried to a desired dried state.

With respect to the drying means in the drying method of in accordance with the embodiments of the present invention, not limited to hot air, other drying methods such as an infra-red-ray drying method, a microwave drying method, a humidity drying method, a current-applying drying method and methods in which these methods are combined with each other may be used.

Among these, the hot-air drying method is desirably used. In the case where hot air is used upon drying the honeycomb molded body, since hot air is allowed to pass through the inside of each cell, the entire honeycomb molded body can be dried uniformly.

Next, the drying jig in which the dried honeycomb molded body is held is transported to the drying jig disassembling apparatus where the dried honeycomb molded body is taken out of the drying jig, and the resulting honeycomb molded body is transported to the outside; thus, the drying process of the honeycomb molded body is completed.

Since the method used for taking out the honeycomb molded body from the drying jig in the drying jig disassembling apparatus has already been explained in the description of the drying jig disassembling apparatus in accordance with the embodiments of the present invention, the description thereof is omitted.

The drying jig to be used in the drying method in accordance with the embodiments of the present invention is desirably used repeatedly, and in this case, it is necessary to transport the drying jig from which the dried honeycomb molded body has been taken out from the drying jig disassembling apparatus to the drying jig assembling apparatus. For this reason, in the drying method in accordance with the embodiments of the present invention, the drying jig circulating conveyor is desirably used as described earlier. Here, since the structure of the drying jig circulating conveyor has already been explained in the description of the drying jig circulating apparatus in accordance with the embodiments of the present invention, the description thereof is omitted.

Moreover, it is not necessarily required to use the drying jig circulating conveyor, and, for example, in the drying jig disassembling apparatus, the drying jig from which the honeycomb molded body has been taken out may be once stored, and this may be then transported to the drying jig disassembling apparatus by using manual labor or the like.

In the drying method of a ceramic molded body in accordance with the embodiments of the present invention having the above-mentioned arrangement, it may become easier to automatically carry out a sequence of processes including a process for mounting a ceramic molded body on the drying jig, a drying process and a process for taking out the ceramic molded body from the drying jig, and consequently to dry the ceramic molded body efficiently without the need for manual labor.

The following description will discuss a method for manufacturing a honeycomb structure in accordance with the embodiments of the present invention.

The honeycomb structure to be manufactured by the manufacturing method in accordance with the embodiments of the present invention may be a honeycomb fired body or the like made by sintering a honeycomb molded body in which a number of cells are placed side by side with a cell wall interposed in between. Therefore, the honeycomb structure may be a honeycomb structure formed by firing pillar-shaped honeycomb molded bodies and combining a plurality of the resulting honeycomb fired bodies with one another by interposing a sealing material layer (adhesive layer) (see FIG. 8). Here, each of the honeycomb molded bodies has a large number of cells longitudinally placed in parallel with one another with a cell wall therebetween. Alternatively, the honeycomb structure may be a pillar-shaped honeycomb structure configured by a single honeycomb sintered body obtained by firing a honeycomb molded body having a large number of cells longitudinally placed in parallel with one another with a cell wall therebetween. In the present specification, the former honeycomb structure in which a plurality of honeycomb fired bodies are combined with one another by interposing a sealing material layer (adhesive layer) is referred to as an aggregated honeycomb structure, and the latter pillar-shaped honeycomb structure including a single honeycomb sintered body is referred to as an integral honeycomb structure.

With respect to the main component of a material for the honeycomb structure to be manufactured by the manufacturing method in accordance with the embodiments of the present invention, examples thereof include: nitride ceramic materials, such as aluminum nitride, silicon nitride, boron nitride and titanium nitride, carbide ceramic materials, such as silicon carbide, zirconium carbide, titanium carbide, tantalum carbide and tungsten carbide, and oxide ceramic materials, such as alumina, zirconia, cordierite, mullite, and aluminum titanate. Among these, powder of silicon carbide that has high heat resistant characteristics, superior mechanical characteristics and a high thermal conductivity is desirably used. Here, materials, such as a silicon-containing ceramic material formed by blending metal silicon in the above-mentioned ceramic material and a ceramic material that is combined by silicon or a silicate compound, may also be used, and for example, a material in which metal silicon is blended in silicon carbide is desirably used.

The following description will discuss the method for manufacturing a honeycomb structure in accordance with the embodiments of the present invention in the order of successive processes and by exemplifying the method for manufacturing a honeycomb structure mainly composed of silicon carbide.

Figure 8:
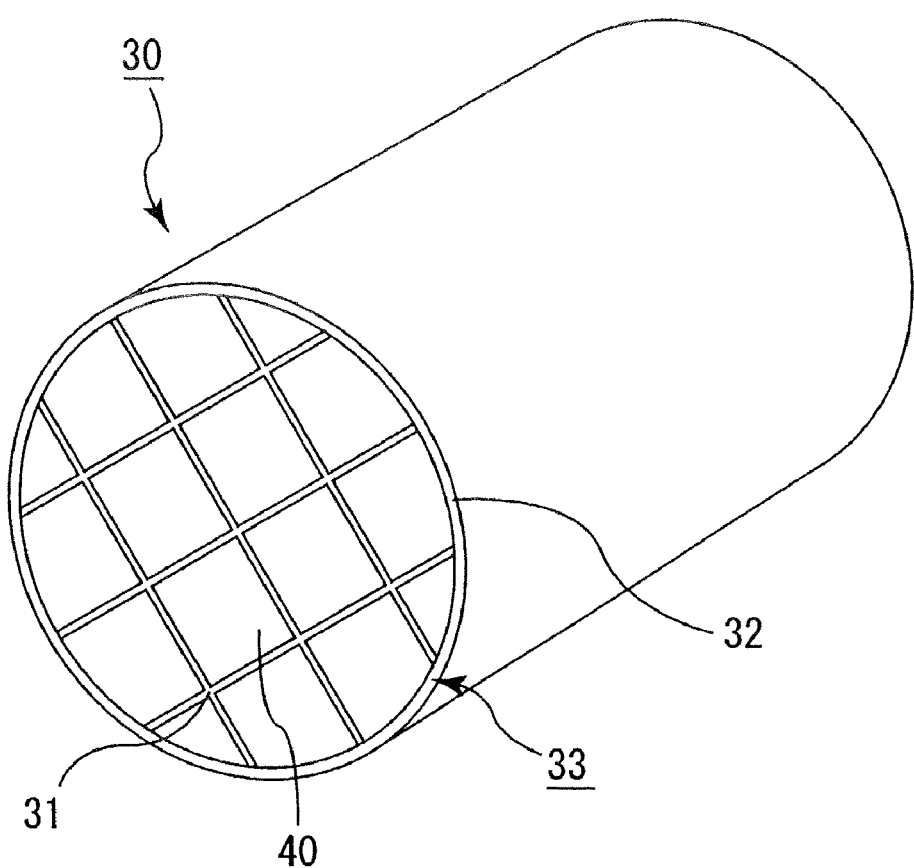
FIG. 8 is a perspective view that schematically shows one example of a honeycomb structure in accordance with one embodiment of the present invention.
Figure 9A:
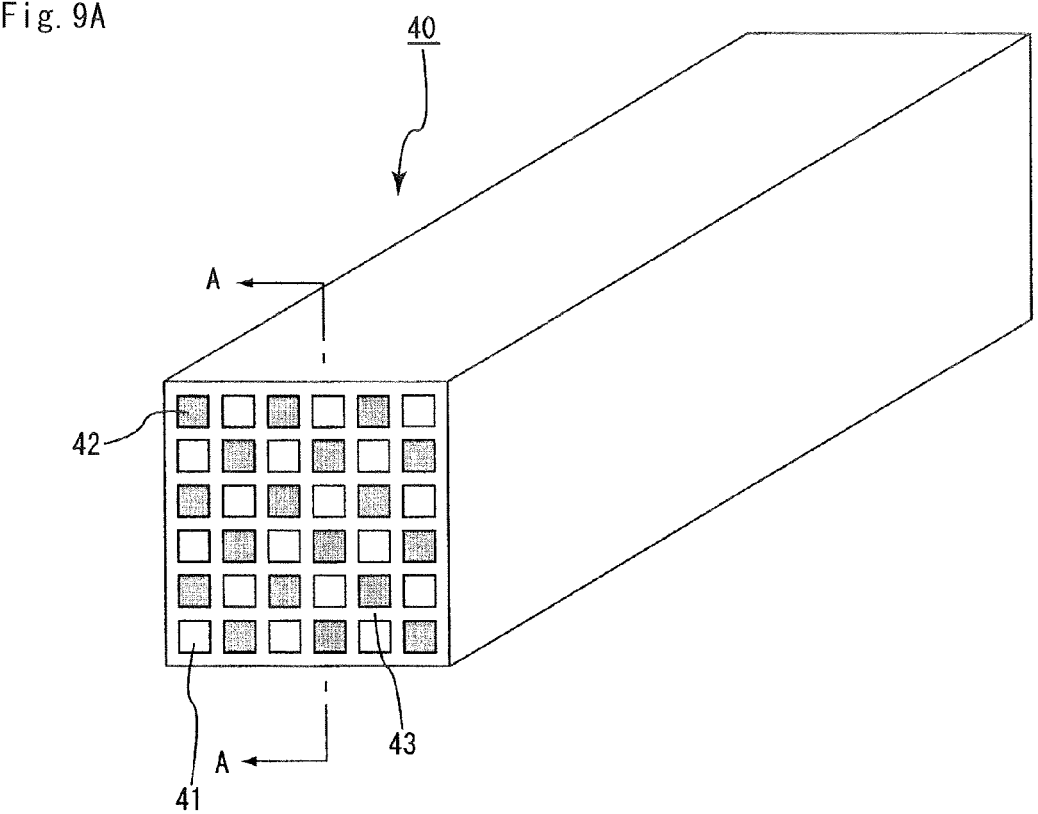
FIG. 9A is a perspective view that schematically shows a honeycomb fired body that forms a honeycomb structure in accordance with one embodiment of the present invention.
Figure 9B:
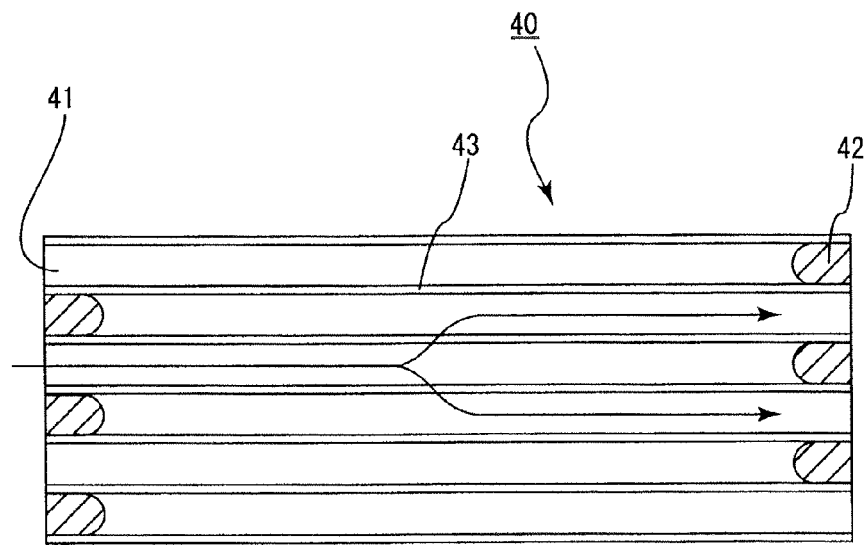
FIG. 9B is a cross-sectional view taken along line A-A of FIG. 9A.

FIG. 8 is a perspective view that schematically shows one example of a honeycomb structure in accordance with one embodiment of the present invention, FIG. 9A is a perspective view that schematically shows a honeycomb fired body that forms the honeycomb structure in accordance with one embodiment of the present invention, and FIG. 9B is a cross-sectional view taken along line A-A of FIG. 9A.

In the honeycomb structure 30, a plurality of honeycomb fired bodies 40 shown in FIG. 9A are combined with one another by interposing a sealing material layer (adhesive layer) 31 to form a honeycomb block 33, and a sealing material layer (coat layer) 32 is further formed on the outer periphery of this honeycomb block 33.

Moreover, as shown in FIG. 9B, the honeycomb fired body 40 has a number of cells 41 longitudinally placed in parallel with one another so that each cell wall 43 that separates the cells 41 is allowed to function as a filter.

In other words, as shown in FIG. 9B, each of the cells 41, formed in the honeycomb fired body 40, is sealed with a plug material layer 42 at either one of ends on its exhaust gas inlet side and exhaust gas outlet side so that exhaust gases that have entered one cell 41 are discharged from another cell 41 after having always passed through each cell wall 43 that separates the cells 41; thus, when exhaust gases pass through the cell wall 43, particulates are captured by the cell wall 43 so that the exhaust gases are purified.

First, inorganic powder, such as silicon carbide powders having different average particle diameters, and an organic binder are dry-mixed to prepare mixed powder, and a liquid-state plasticizer, a lubricant and water are mixed to prepare a mixed liquid, and the mixed powder and the mixed liquid are mixed by using a wet mixer so that a wet mixture to be used for molding is prepared.

With respect to the particle diameter of silicon carbide powder, although not particularly limited, those which are less susceptible to shrinkage in the succeeding firing process are desirably used, and for example, mixed powder, prepared by combining 100 parts by weight of powder having an average particle diameter of at least about 0.3 µm and at most about 50 µm with at least about 5 parts by weight and at most about 65 parts by weight of powder having an average particle diameter of at least about 0.1 µm and at most about 1.0 µm, is desirably used.

In order to adjust the pore diameter and the like of the honeycomb fired body, it is necessary to adjust the firing temperature; however, the pore diameter can be adjusted by adjusting the particle diameter of the inorganic powder.

With respect to the above-mentioned organic binder, not particularly limited, examples thereof include: methylcellulose, carboxymethyl cellulose, hydroxyethyl cellulose, polyethylene glycol and the like. Among these, methylcellulose is more desirably used.

In general, the compounding amount of the above-mentioned binder is desirably set to at least about 1 part by weight and at most about 10 parts by weight with respect to 100 parts by weight of the inorganic powder.

With respect to the above-mentioned plasticizer, not particularly limited, for example, glycerin and the like may be used.

Moreover, with respect to the lubricant, not particularly limited, for example, polyoxy alkylene based compounds, such as polyoxyethylene alkyl ether and polyoxy propylene alkyl ether, may be used.

Specific examples of the lubricant include: polyoxyethylene monobutyl ether and polyoxypropylene monobutyl ether.

Here, the plasticizer and the lubricant are not necessarily contained in the mixed liquid depending on cases.

Upon preparing the wet mixture, a dispersant solution may be used, and with respect to the dispersant solution, examples thereof include: water, an organic solvent such as benzene, and alcohol such as methanol and the like.

Moreover, a molding auxiliary may be added to the wet mixture.

With respect to the molding auxiliary, not particularly limited, examples thereof include: ethylene glycol, dextrin, fatty acid, fatty acid soap and polyalcohol and the like.

Furthermore, balloons that are fine hollow spheres composed of oxide-based ceramics, and spherical acrylic particles, graphite and the like, may be added to the above-mentioned wet mixture as a pore forming agent, if necessary.

With respect to the above-mentioned balloons, not particularly limited, for example, alumina balloons, glass microballoons, shirasu balloons, fly ash balloons (FA balloons) and mullite balloons and the like may be used. Among these, alumina balloons are more desirably used.

Here, with respect to the wet mixture using silicon carbide powder, prepared as described above, the temperature thereof is desirably set to about 28° C. or less. When the temperature is too high, the organic binder tends to be gelatinized.

Moreover, the rate of organic components in the wet mixture is desirably set to about 10% by weight or less, and the content of moisture is desirably set to at least about 8% by weight and at most about 20% by weight.

Next, the wet mixture is extrusion-molded by an extrusion-molding method or the like. The molded body obtained through the extrusion molding is cut by a cutting machine so that a honeycomb molded body without plugged cells, which has the same shape as the pillar-shaped honeycomb fired body 40 shown in FIGS. 9A, 9B, is prepared.

Next, a drying process is carried out on the honeycomb molded body.

With respect to the specific method for the drying process, the same method as the aforementioned drying method in accordance with the embodiments of the present invention in which the drying jig is used may be used.

Here, the ceramic molded body holding mechanism described by using FIGS. 3A, 3B is allowed to function as the honeycomb molded body holding mechanism.

In the above-mentioned drying process, the moisture content of the honeycomb molded body after the drying process is desirably set to at least about 0% by weight and at most about 2% by weight.

The reason for this arrangement is explained as follows: In the case of the moisture content is 2% by weight or less, when moisture is further evaporated from the honeycomb molded body that has been taken out of the drying jig, warping and the like tend not to occur in the honeycomb molded body.

By carrying out such a drying process, it may become easier to obtain a dried body of the honeycomb molded body that is free from warping and the like.

Moreover, in the method for manufacturing a honeycomb structure in accordance with the embodiments of the present invention, a pre-drying process may be carried out prior to the above-mentioned drying method.

This pre-drying process is desirably carried out prior to holding the honeycomb molded body on a drying jig, by using a microwave drying method or the like.

Since the honeycomb molded body, preliminarily dried by the microwave drying process or the like in this manner, has a higher strength in comparison with that of an undried molded body, it may become easier to provide a better handling property and the like, for example, upon mounting the honeycomb molded body on a lower jig of the drying jig. Moreover, even in the case where the honeycomb molded body is placed at a position different from the predetermined position on the lower jig, the position correcting process is more likely to be prevented from causing damages such as deterioration to the honeycomb molded body.

In the case where the drying process is carried out prior to the holding process by the drying jig by using microwaves, honeycomb molded bodies, prepared through, for example, an extrusion-molding process or the like, are transported to a molded body passage inside a microwave drying apparatus including a microwave generation device and microwave stirring blades.

In the microwave drying apparatus, the microwave stirring blades are used to stir microwaves to be applied to the honeycomb molded bodies; thus, microwaves are uniformly applied to the honeycomb molded bodies so that the dispersant solution and the like are heated and therefore the honeycomb molded bodies are dried.

Moreover, the power of microwaves to be applied upon carrying out the pre-drying process by the use of the microwaves is not generally determined since it depends on the shape and the size of cells of each honeycomb molded body to be dried; however, for example, when the size of the honeycomb molded body is set to 33 mm×33 mm×300 mm, with the number of cells being set to 31 pcs/cm$^2$ and the thickness of the cell wall being set to 0.35 mm, the power of microwaves is desirably set to at least about 4 kW and at most about 50 kW. Here, even when the shape and the size of the honeycomb molded body are made different, the conditions of the drying process presumably do not deviate greatly from the above-mentioned conditions.

Moreover, in the case where the pre-drying process is carried out, the moisture content inside the honeycomb molded body after the pre-drying process is desirably set to at least about 30% by weight and at most about 70% by weight of the moisture content inside the honeycomb molded body before the pre-drying process.

When the moisture content after the drying process is about 30% by weight or more of the moisture content before the pre-drying process, the moisture content inside the honeycomb molded body does not become too small so that warping, cracks and the like are less likely to occur in the honeycomb molded body; in contrast, when an attempt is made not to reduce the moisture content to less than about 30% by weight thereof, the microwaves tend not to come to be absorbed by the ceramic powder so that the temperature of the ceramic powder in the honeycomb molded body rises abruptly to cause a degreasing process to start but not to occur easily. In the case where the moisture content after the drying process is 70% by weight or less thereof before the drying process, the drying process tends not to become insufficient, likely facilitating handling.

Here, the moisture content after the drying process tends to be adjusted by adjusting the drying time, the output of microwaves, the temperature of hot air, and the like.

Next, a predetermined amount of plug material paste that forms plugs is injected into ends on the outlet side of a group of cells on the inlet side and ends on the inlet side of a group of cells on the outlet side so that the cells are plugged.

With respect to the plug material paste, although not particularly limited, those plug material pastes that allow the plugs manufactured through post processes to have a porosity of at least about 30% and at most about 75% are desirably used, and, for example, the same material as that of the wet mixture may be used.

The injecting process of the plug material paste can be carried out on demand, and when the plug material paste has been injected thereto, for example, the resulting honeycomb structure obtained through the post process is desirably used as a honeycomb filter, and in the case where no plug material paste has been injected thereto, for example, the honeycomb structure obtained through the post process is desirably used as a catalyst supporting carrier.

Next, a degreasing process (for example, at about 200° C. to about 500° C.) and a firing process (for example, at about 1400° C. to about 2300° C.) under predetermined conditions are carried out on the honeycomb molded body having the plug material paste injected therein, so that it is possible to manufacture a pillar-shaped honeycomb fired body in which: a plurality of cells are longitudinally placed in parallel with one another with a cell wall therebetween, and either one of ends of the cells is plugged.

With respect to the conditions of the degreasing and firing processes of the honeycomb molded body, conventional conditions that have been used upon manufacturing a filter made from a porous ceramic material may be adopted.

Next, a sealing material paste, which forms a sealing material layer (adhesive layer), is applied onto side faces of the honeycomb fired body with a uniform thickness, and a process for piling up other honeycomb fired bodies on this sealing material paste layer is successively repeated so that an aggregate of honeycomb fired bodies having a predetermined size is manufactured.

With respect to the sealing material paste, examples thereof include a material made from inorganic fibers and/or inorganic particles in addition to an inorganic binder and an organic binder.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose and carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers, such as silica-alumina, mullite, alumina and silica. Each of these may be used alone or two or more kinds of these may be used in combination. Among the inorganic fibers, alumina fibers are more desirably used.

With respect to the inorganic particles, examples thereof include carbides and nitrides and the like, and specific examples include inorganic powder or the like made from silicon carbide, silicon nitride and boron nitride. Each of these may be used alone, or two or more kinds of these may be used in combination. Among the inorganic particles, silicon carbide having superior thermal conductivity is desirably used.

Moreover, balloons that are fine hollow spheres composed of oxide-based ceramics, and spherical acrylic particles, graphite and the like, may be added to the above-mentioned sealing material paste as a pore forming agent, if necessary.

With respect to the above-mentioned balloons, not particularly limited, for example, alumina balloons, glass microballoons, shirasu balloons, fly ash balloons (FA balloons) and mullite balloons and the like may be used. Among these, alumina balloons are more desirably used.

Next, this aggregate of honeycomb fired bodies is heated so that the sealing material paste is dried and solidified to form a sealing material layer (adhesive layer).

Next, a cutting process is carried out on the aggregate of honeycomb fired bodies in which a plurality of honeycomb fired bodies have been bonded to [one another by interposing the sealing material layer (adhesive layer), by using a diamond cutter or the like so that a cylindrical honeycomb block is manufactured.

In the present specification, the shape indicated by the word "pillar" refers to any desired shape of a pillar including a round pillar, an oval pillar, a polygonal pillar and the like.

Then, a sealing material layer (coat layer) is formed on the periphery of the honeycomb block by using the above-mentioned sealing material paste so that a honeycomb structure in which a sealing material layer (coat layer) is formed on the periphery of the cylindrical honeycomb block having a structure in which a plurality of honeycomb fired bodies are combined with one another by interposing a sealing material layer (adhesive layer) is manufactured.

Thereafter, a catalyst is supported on the honeycomb structure on demand. The supporting process of the catalyst may be carried out on the honeycomb fired bodies prior to being formed into an aggregate.

In the case where a catalyst is supported thereon, an alumina film having a high specific surface area is desirably formed on the surface of the honeycomb structure, and a co-catalyst and a catalyst such as platinum are applied onto the surface of the alumina film.

With respect to the method for forming the alumina film on the surface of the honeycomb structure, for example, a method in which the honeycomb structure is impregnated with a solution of a metal compound containing aluminum such as $Al(NO_3)_3$ and then heated and a method in which the honeycomb structure is impregnated with a solution containing alumina powder and then heated, are proposed.

With respect to the method for applying a co-catalyst to the alumina film, for example, a method in which the honeycomb structure is impregnated with a solution such as a metal compound containing a rare-earth element, such as $Ce(NO_3)_3$, and then heated is proposed.

With respect to the method for applying a catalyst to the alumina film, for example, a method in which the honeycomb structure is impregnated with a solution such as diammine dinitro platinum nitric acid ($[Pt(NH_3)_2(NO_2)_2]HNO_3$, platinum concentration: about 4.53% by weight) and then heated is proposed.

Moreover, a catalyst may be applied through a method in which after the catalyst has been preliminarily applied to alumina particles, the honeycomb structure is impregnated with a solution containing the alumina powder bearing the catalyst applied thereto, and then heated.

Here, the above-mentioned method for manufacturing a honeycomb structure relates to an aggregated honeycomb structure; however, the honeycomb structure to be manufactured by the manufacturing method in accordance with the embodiments of the present invention may be a honeycomb structure (integral honeycomb structure) in which a pillar-shaped honeycomb block is configured by a single piece of the honeycomb fired body.

With respect to the main constituent material of the aggregated honeycomb structure, silicon carbide and a material formed by blending metal silicon in silicon carbide are desirably used, and with respect to the main constituent material of the integral honeycomb structure, cordierite and aluminum titanate are desirably used.

Upon manufacturing such an integral honeycomb structure, first, a honeycomb molded body is formed by using the same method as the method for manufacturing an aggregated honeycomb structure except that the size of a honeycomb molded body to be formed through the extrusion-molding process is greater than that of the aggregated honeycomb structure.

Then, in the same manner as the manufacturing of the aggregated honeycomb structure, a pre-drying process is carried out according to need, and the resulting honeycomb molded body is further dried by using the drying jig disassembling apparatus, a drying apparatus, the drying jig assembling apparatus, and the like.

Next, a predetermined amount of plug material paste that forms plugs is injected into ends on the outlet side of a group of cells on the inlet side and ends on the inlet side of a group of cells on the outlet side so that predetermined cells are sealed.

Thereafter, in the same manner as the manufacturing of the aggregated honeycomb structure, the degreasing and firing processes are carried out to manufacture a honeycomb block, and by forming a sealing material layer (coat layer), if necessary, an integral honeycomb structure can be manufactured. Moreover, a catalyst may be supported on the integral honeycomb structure by using the above-mentioned method in the same manner.

In the method for manufacturing a honeycomb structure in accordance with the embodiments of the present invention as explained above, it may become easier to desirably manufacture a honeycomb structure having a desired shape.

Moreover, with respect to the honeycomb structure, the foregoing explanation has been given mainly on a honeycomb filter that is used to capture particulates in exhaust gases; however, the honeycomb structure tends to be desirably used also as a catalyst supporting carrier (honeycomb catalyst) that converts exhaust gases.

EXAMPLES

Example 1

Powder of α-type silicon carbide having an average particle diameter of 10 μm (250 kg), powder of α-type silicon carbide having an average particle diameter of 0.5 μm (100 kg) and an organic binder (methylcellulose) (20 kg) were mixed to prepare mixed powder.

Next, separately, a lubricant (UNILUB, manufactured by NOF Corp.) (12 kg), a plasticizer (glycerin) (5 kg) and water (65 kg) were mixed to prepare a liquid mixture, and this liquid mixture and the mixed powder were mixed by using a wet mixer so that a wet mixture was prepared.

Here, the moisture content of the wet mixture prepared was 14% by weight.

Next, this wet mixture was transported to an extrusion molding machine by using a transporting device, and charged into a material charging port of the extrusion molding machine.

The moisture content of the wet mixture immediately before the charging into the extrusion molding machine was 13.5% by weight.

The wet mixture was then extrusion-molded into a molded body having the same shape as shown in FIGS. 9A, 9B except that ends of the cells had not been plugged.

Next, a pre-drying process was carried out by using a drying apparatus in which microwaves and hot air are used in combination to dry the honeycomb molded body so that the moisture content thereof was reduced by 40%.

Thereafter, the honeycomb molded body in which the moisture content was reduced by 40% was hot-air dried while being held by a drying jig 100 (made from epoxy resin) by using the drying jig circulating apparatus 110 shown in FIG. 6.

Here, the drying conditions were set as follows: the temperature inside the drying furnace 152 was 100° C., the speed of hot air was 50.0 m/sec, and the staying time inside the drying furnace 152 was 15 min. Here, the moisture content after the drying process was 1% by weight.

Next, a plug material paste having the same composition as the wet mixture was injected into predetermined cells.

Next, after having been again dried by using a drying apparatus, the honeycomb molded body was degreased at 400° C. for 3 hours, and also a firing process at 2200° C. for 3 hours under a normal-pressure argon atmosphere was carried out thereon so that a honeycomb fired body, made of a silicon carbide sintered body, which had a porosity of 40%, an average pore diameter of 12.5 μm, a size of 34.3 mm×34.3 mm×254 mm, the number of cells (cell density) of 46.5 pcs/cm$^2$ and a thickness of each cell wall of 0.20 mm, was manufactured.

By using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a large number of the honeycomb fired bodies were bonded to one another, and this was dried at 120° C., and then cut by using a diamond cutter so that a cylindrical honeycomb block having a sealing material layer (adhesive layer) with a thickness of 1 mm was manufactured.

Next, silica-alumina fibers (average fiber length: 100 μm, average fiber diameter: 10 μm) (23.3% by weight), which served as inorganic fibers, silicon carbide powder having an average particle diameter of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer (coat layer) having a thickness of 0.2 mm was formed on the peripheral portion of the honeycomb block by using the above-mentioned sealing material paste. Further, this sealing material paste layer was dried at 120° C. so that a cylindrical honeycomb structure having a size of 143.8 mm in diameter×254 mm in length, with a sealing material layer (coat layer) formed on the outer periphery, was manufactured.

By using the method of the present example, a honeycomb structure that was free from warping and the like in the honeycomb fired body and had a desired shape was manufactured.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A drying method of a ceramic molded body comprising:

mounting a ceramic molded body at a predetermined position of a drying jig placed on a movable table by using a robot arm of a molded body mounting mechanism of a drying jig assembling apparatus, said drying jig being either a drying jig configured by two or more separate jigs, any of the separate jigs including a fixing member that integrates the separate jigs to surround the ceramic molded body, or a drying jig formed by one openable jig, including a fixing member for maintaining a closed state to suffound the ceramic molded body;

handling the fixing member after said drying jig is integrated or put in the closed state using a ceramic molded body holding mechanism of a drying jig assembling apparatus so that the drying jig is maintained in a state holding and surrounding the outer periphery of the ceramic molded body with a close contact manner;

receiving the drying jig holding the ceramic molded body from said drying jig assembling apparatus and delivering said drying jig holding the ceramic molded body to a drying apparatus by using a jig delivering mechanism of the drying jig assembling apparatus;

drying the ceramic molded body with the ceramic molded body being held on a drying jig using the drying apparatus;

receiving the drying jig holding the ceramic molded body using a jig receiving mechanism of a drying jig disassembling apparatus from the drying apparatus;

handling the fixing member using a jig releasing mechanism of the drying jig disassembling apparatus in such a manner that the held and surrounded state of the ceramic molded body maintained by the drying jig placed on another movable table is released; and taking out the ceramic molded body held by the drying jig by using a robot arm of a molded body taking-out mechanism of the drying jig disassembling apparatus, wherein said mounting the ceramic molded body at a predetermined position of the drying jig, said handling the fixing member after the drying jig is integrated or put in the closed state, and said receiving the drying jig holding the ceramic molded body from said drying jig assembling apparatus are carried out simultaneously on successive drying jigs and ceramic molded bodies, which include the drying jig and the ceramic molded bodies, after said movable table intermittently repeats rotating and stopping operations for conveying the successive drying jigs and the ceramic molded bodies; and wherein said receiving the drying jig holding the ceramic molded body, said handling said fixing member using a jig releasing mechanism of the drying jig disassembling apparatus, and said taking out the ceramic molded body held by the drying jig are carried out simultaneously on successive drying jigs and ceramic molded bodies, which include the drying jig and the ceramic molded bodies, after said another movable table intermittently repeats rotating and stopping operations for conveying the successive drying jigs and the ceramic molded bodies.

2. The drying method of a ceramic molded body according to claim 1, further comprising:

using a drying jig circulating conveyor for transporting the drying jig from which the ceramic molded body has been taken out by said drying jig disassembling apparatus to said drying jig assembling apparatus.

3. The drying method of a ceramic molded body according to claim 1,
wherein
said ceramic molded body held by said drying jig is dried while said drying jig is transported one stage by one stage or transported on the drying jigs stacked in multiple stages.

4. The drying method of a ceramic molded body according to claim 1,
wherein
said drying apparatus comprises a drying furnace with an inter-furnace transporting conveyor used for transporting said drying jig.

5. The drying method of a ceramic molded body according to claim 4,
wherein
said drying apparatus is provided with a plurality of hot-air blowing openings and/or a plurality of cold-air blowing openings on both of sides of said inter-furnace transporting conveyor.

6. The drying method of a ceramic molded body according to claim 1,
wherein
said ceramic molded body is a pillar-shaped honeycomb molded body.

* * * * *

UNITED STATES PATENT AND TRADEMARK OFFICE
CERTIFICATE OF CORRECTION

| | | |
|---|---|---|
| PATENT NO. | : 7,708,933 B2 | Page 1 of 1 |
| APPLICATION NO. | : 11/928359 | |
| DATED | : May 4, 2010 | |
| INVENTOR(S) | : Kenichiro Kasai and Kazuya Naruse | |

It is certified that error appears in the above-identified patent and that said Letters Patent is hereby corrected as shown below:

Column
31, Line 13, the line should read as follows:
to surround the ceramic molded body;

Signed and Sealed this
Eighth Day of March, 2011

David J. Kappos
*Director of the United States Patent and Trademark Office*